United States Patent
Thorsted et al.

(10) Patent No.: US 9,292,726 B2
(45) Date of Patent: Mar. 22, 2016

(54) SYSTEM AND METHOD FOR IMAGING EVIDENCE DEPOSITED ON CURVED SURFACES

(71) Applicants: Michael K. Thorsted, Spotsylvania, VA (US); Ian A. Moore, Fredericksburg, VA (US)

(72) Inventors: Michael K. Thorsted, Spotsylvania, VA (US); Ian A. Moore, Fredericksburg, VA (US)

(73) Assignee: SYNTRONICS, LLC, Fredericksburg, VA (US)

( * ) Notice: Subject to any disclaimer, the term of this patent is extended or adjusted under 35 U.S.C. 154(b) by 0 days.

(21) Appl. No.: 14/579,254

(22) Filed: Dec. 22, 2014

(65) Prior Publication Data

US 2015/0178545 A1   Jun. 25, 2015

Related U.S. Application Data

(60) Provisional application No. 61/919,386, filed on Dec. 20, 2013.

(51) Int. Cl.
*G06K 9/00* (2006.01)

(52) U.S. Cl.
CPC ............................... *G06K 9/00026* (2013.01)

(58) Field of Classification Search
None
See application file for complete search history.

(56) References Cited

U.S. PATENT DOCUMENTS

| | | |
|---|---|---|
| 5,099,131 A | 3/1992 | Brownrigg et al. |
| 5,289,218 A | 2/1994 | Pippin |
| 6,871,684 B2 | 3/2005 | Engelbart et al. |
| 7,154,661 B2 | 12/2006 | Seah et al. |
| 7,489,391 B2 | 2/2009 | Engheta et al. |
| 7,646,973 B2 | 1/2010 | Howard et al. |
| 7,660,442 B2 | 2/2010 | Sweeney et al. |
| 8,142,834 B2 | 3/2012 | Bond |
| 8,265,352 B1 | 9/2012 | Neoh et al. |
| 8,437,517 B2 | 5/2013 | Miesak et al. |
| 2010/0265320 A1 | 10/2010 | Treado et al. |

OTHER PUBLICATIONS

Gimp Documentation, from docs.gimp.org, web archive available 2007.*
Bremond, Object Tracking Using a Particle Filter based on SIFT Features, Inria/Raweb 2011.*
Penven, www.scitechblog.com, Dec. 2010.*
Wikipedia, Full Spectrum Photography, web archive date Sep. 2012.*
Wikipedia, Flash Photography, web archive date Oct. 2011.*

(Continued)

*Primary Examiner* — Mark Roz
(74) *Attorney, Agent, or Firm* — Finnegan, Henderson, Farabow, Garrett & Dunner LLP

(57) ABSTRACT

Systems and methods are disclosed for capturing images of latent evidence such as a latent fingerprint provided on a curved or irregular surface of an object. According to certain embodiments, a latent fingerprint provided on a curved or irregular surface of an object is illuminated by a UV lamp. An aspect of the latent fingerprint is specularly reflected from the surface of the object and captured by an image capturing device. In various embodiments, the UV lamp is repositioned, or the object is rotated and translated, such that a second aspect of the latent fingerprint is then specularly reflected from the surface of the object and captured by the image capturing device. The first and second images are then integrated by performing a pixel-to-pixel comparison of corresponding pixel data in the captured images. A device is also provided for rotating and translating the object for use in the disclosed embodiments.

20 Claims, 8 Drawing Sheets

(56) References Cited

OTHER PUBLICATIONS

Diego Gonzalez et al, A Low Cost Matching Motion Estimation Sensor Based on the NIOS II Microprocessor, Sensors, 2012.*

Alec (http://thechive.com/2013/10/09/sometimes-too-much-is-just-enough-32-photos/, "Excess is in the Eye of the Beholder", Oct. 2013.*

"CERA LT—The Machine", Consolite® Forensics Ltd., http://www.consolite.com.uk/Forensics/CERALTmachine.html. pp. 1-2 (Jan. 5, 2014).

"CERA LT—The Scene", Consolite® Forensics Ltd., http://www.consolite.com.uk/Forensics/CERALTscene.html, pp. 1-2 (Jan. 5, 2014).

"CERA LT—The Process", Consolite® Forensics Ltd., http://www.consolite.com.uk/Forensics/CERALTprocess.html, pp. 1-2 (Jan. 5, 2014).

"CERA LT—The Software", Consolite® Forensics Ltd., http://www.consolite.com.uk/Forensics/CERALTsoftware.html, pp. 1-2 (Jan. 5, 2014).

"New Software Application Helps Police Obtain Detailed Fingerprint Evidence", VisionSystems Design, http://www.vision-systems.com/articles/2001/11/new-software-application-helps-police-obtain-detailed-fingerprint-evidence.html, pp. 1-5 (Jan. 5, 2014).

"Syncroscopy—Digital 3D Microscopy", http://www.syncroscopy.com/syncroscopy (Jan. 6, 2014).

"Syncroscopy—Syncroscan Example Application Areas", http://www.syncroscopy.com/syncrsocopy/syncroscanaps.asp (Jan. 6, 2014).

"Syncroscopy—Microscopy Fields: Forenscis", http://www.syncroscopy.com/syncroscopy/microscopy.asp?field=Forenscis (Jan. 6, 2014).

"Benchmarking Contact-less Surface Measurement Devices for Fingerprint Acquisition in Forensic Investigations: Results for a Differential Scan Approach with a Chromatic White Light Sensor", Hilderband, M. et al., IEEExplore® Digital Library (Jan. 6, 2014).

"iDefectFinder: Automated Macro Defect Inspection System for Curved Surface", Applied Electro-Optics Inc., http://www.aeousa.com/defect-inspection.html. pp. 1-3 (Jan. 6, 2014).

\* cited by examiner

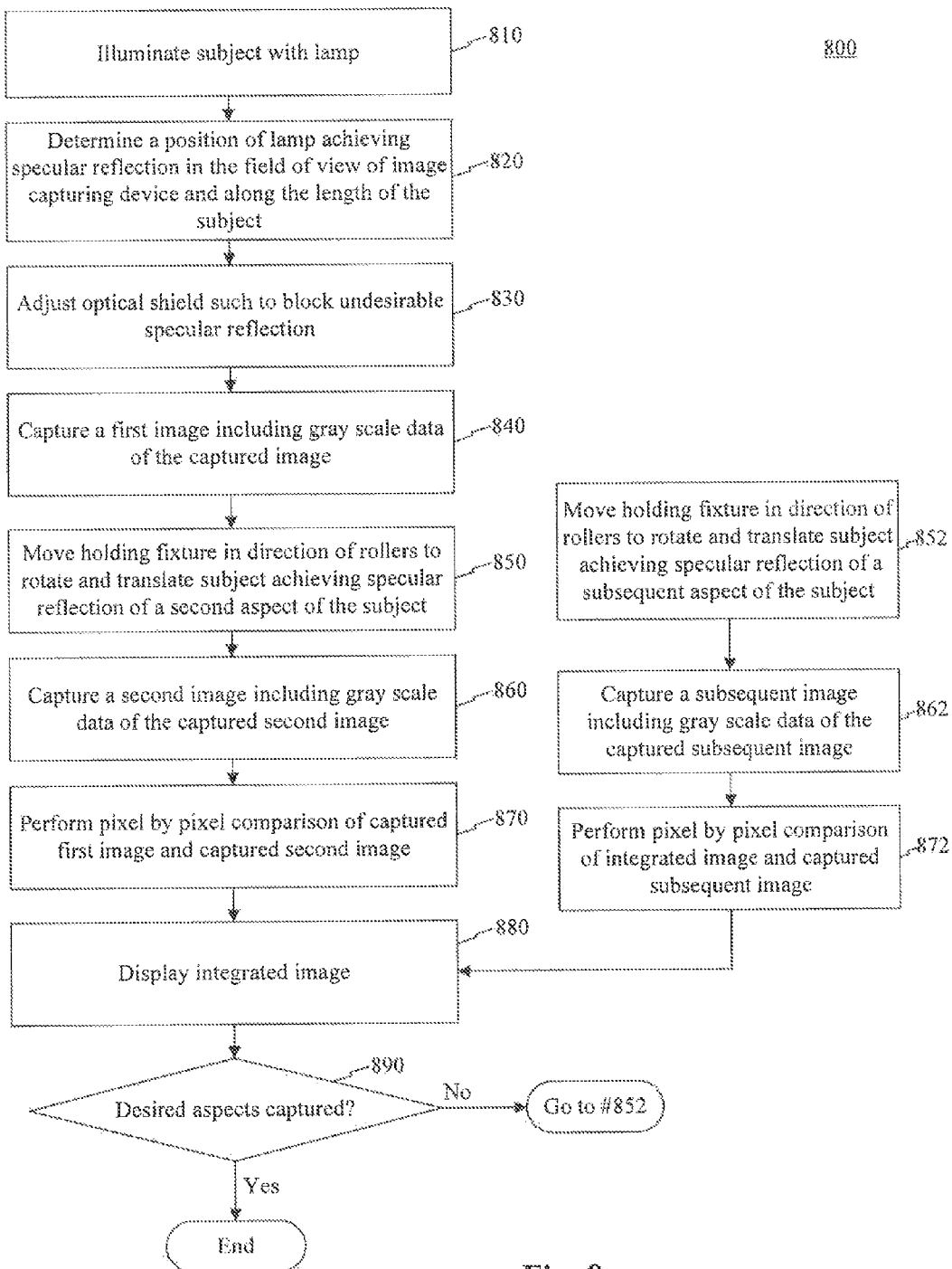

SYSTEM AND METHOD FOR IMAGING EVIDENCE DEPOSITED ON CURVED SURFACES

CROSS-REFERENCE TO RELATED APPLICATIONS

This application claims priority to U.S. Provisional Application No. 61/919,386, filed Dec. 20, 2013, which is incorporated herein by reference.

TECHNICAL FIELD

The present disclosure is directed to a method and system for imaging evidence on curved or irregular surfaces. More particularly, the present disclosure details a method for illuminating aspects of forensic evidence, such as a latent fingerprint, capturing the various illuminated aspects in a number of images, and integrating the illuminated aspects in the number of images to form an integrated image of the latent fingerprint. The present disclosure also details a system including a device for rotating and/or translating a cylindrical object to facilitate the capture, by an imaging device, of a latent fingerprint disposed on the curved surface using the disclosed methods.

BACKGROUND

Crime scene investigators are often challenged with the task of detecting and analyzing forensic evidence that is not visible to the human eye, most notably latent fingerprints. To detect otherwise invisible forensic evidence, including latent fingerprints, investigators have relied on numerous techniques utilizing various wavelengths of light. Some systems have relied upon wavelengths that are included in the ultraviolet ("UV") spectrum, also known as UV radiation. Latent fingerprint detection techniques have historically required additional fluorescent chemical processing, such as dusting with a fluorescent dusting powder or chemical dyeing prior to UV radiation exposure, in order to make the fingerprints visible to the unaided eye or otherwise capable of being captured by an image capturing device or other capturing techniques. These dusting and dying techniques may be disadvantageous, however, at least because once they are applied, they may prevent investigators from extracting DNA evidence that may also be included in the forensic sample.

In certain situations, RUVIS (Reflective Ultra-Violet Imaging System) technology, which enables a user to see latent fingerprints on nonporous surfaces without requiring treatment with powders or dyes, may be used to examine latent fingerprints. RUVIS technology works on the principle that surfaces either reflect or absorb light to varying degrees in the UV spectrum. When UV radiation illuminates a surface containing a latent fingerprint, the fingerprint stands out as darker or lighter than the background based on whether the surface reflects or absorbs the UV radiation more or less than the latent fingerprint, respectively. In many situations though, a latent fingerprint may be provided on a surface that makes it difficult to accurately capture the fingerprint.

For example, in certain situations, it has been difficult and time consuming to photograph, digitally or otherwise, latent fingerprints or other evidence deposited on a curved or irregular surface such as a wine glass, shell casing, pen, or crinkled aluminum foil. The nature of the curved surface may also contribute to difficulty in capturing a latent fingerprint because a light source used on a reflective surface may create a glare (specular reflection), which can also complicate the capture of contrasted aspects of a latent fingerprint due to illumination of overly bright aspects of the fingerprint. Traditionally, in these situations, the latent fingerprint was either chemically treated so as to fluoresce, or it was necessary to evenly illuminate the latent fingerprint using multiple light sources to minimize the specular reflection. Even illumination of a subject using multiple light sources may be difficult to attain, however, and may still result in aspects of the fingerprint being overly illuminated thus degrading the quality of the captured image.

Additionally, in these situations, because certain aspects of the fingerprint are farther away from the camera lens, such as the edges of a fingerprint on a curved surface, a lens with a small aperture may be employed to maximize the depth of field and maintain focus over the curved surface. Because of the small aperture, the camera exposure time must then be increased in order to gather enough light to capture an image of the fingerprint. But, with some shiny surfaces containing latent fingerprints, such as aluminum cans and metal shell casings, it may be difficult to avoid specular reflection from the one or more light sources. And when using a longer exposure, some aspects of the captured image may be overexposed due to the overly bright specular reflection, thus making it very difficult to capture a latent fingerprint of sufficient quality.

In addition, it has been difficult or impossible to photograph chemically treated (or untreated), latent fingerprints (chamber marks or other evidence) deposited on a small diameter curved surface, such as a small caliber shell casing. Due to the small diameter, the edges of a latent fingerprint, for example, may be significantly farther away from a camera lens as compared to a center of the fingerprint closest to a camera lens. Due to the physical limitations of optical devices, the entire latent fingerprint may not be seen in focus at one time from any angle.

Thus, some systems have relied upon taking multiple images at different angles to capture a fully focused fingerprint. The multiple images were then stitched together electronically. Such stitching methods, however, require considerable time and skill to correctly append aspects of the various images along precise boundaries of the fingerprint to recreate the fingerprint in a single image. Because these methods may require considerable user interaction, there may be an increased risk of user error that reduces the reliability or authenticity of an image of a fingerprint specimen generated in this manner. Stitching numerous images together in this manner may also create a very large image-file-size that may be difficult to work with in a number of other applications.

SUMMARY

The present disclosure provides methods and systems that capture the specular reflection of aspects of a latent fingerprint (or other latent evidence) in multiple images and integrate the images to create a fully captured latent fingerprint without requiring arduous and unreliable stitching methods to recreate the latent fingerprint, especially for those on curved or irregular surfaces.

In one aspect, the disclosure is directed toward a system for capturing an image of a specimen using an image capturing device. In this aspect, the system comprises a memory storing a set of instructions, and at least one processor configured to execute one or more of the set of instructions. Upon executing the set of instructions, the processor receives first image information corresponding to a first image captured by the image capturing device. The first image information may include a pixel value for each pixel of the captured first image. Additionally, the first image may also include a specular reflection of a first aspect of the specimen. The processor also receives second image information corresponding to a second image captured by the in capturing device. The second information may include a pixel value for each pixel of the captured second image. Additionally, the second image may include a specular reflection of a second aspect of the specimen. The processor may also compare a first plurality of pixel values of the captured first image with a corresponding second plurality of pixel values of the captured second image and determine, for each pixel of the first plurality of pixel values, whether a selected pixel from the first plurality of pixels or a corresponding pixel from the second plurality of pixel values has a higher pixel value. The processor may then store in a pixel value set the pixel value of the selected pixel from the first plurality of pixels if the selected pixel has a higher pixel value than the corresponding pixel from the second plurality of pixel values, or store in the pixel value set the pixel value of the corresponding pixel from the second plurality of pixels if the corresponding pixel has a higher pixel value than the selected pixel from the first plurality of pixels. In this aspect, the pixel value set provides an integrated image of the specimen.

In another aspect, the disclosure is directed toward a computer readable medium that comprises a set of instructions executable by at least one processor to cause the at least one processor to perform a method for capturing an image of a specimen. In this aspect, the method includes receiving first image information corresponding to a first image captured by the image capturing device. The first image information may include a pixel value for each pixel of the captured first image. Additionally, the first image may also include a specular reflection of a first aspect of the specimen. The method also includes receiving second image information corresponding to a second image captured by the image capturing device. The second information may include a pixel value for each pixel of the captured second image. Additionally, the second image may include a specular reflection of a second aspect of the specimen. The method then includes comparing a first plurality of pixel values of the captured first image with a corresponding second plurality of pixel values of the captured second image and determining, for each pixel of the first plurality of pixel values, whether a selected pixel from the first plurality of pixels or a corresponding pixel from the second plurality of pixel values has a higher pixel value. The method in this aspect may then include storing in a pixel value set the pixel value of the selected pixel from the first plurality of pixels if the selected pixel has a higher pixel value than the corresponding pixel from the second plurality of pixel values, or storing in the pixel value set the pixel value of the corresponding pixel from the second plurality of pixels if the corresponding pixel has a higher pixel value than the selected pixel from the first plurality of pixels. In this aspect, the pixel value set provides an integrated image of the specimen.

In another aspect, the disclosure is directed toward a method performed by one or more processors for capturing an image of a specimen using an image capturing device. In this aspect, the method includes receiving first image information corresponding to a first image captured by the image capturing device. The first image information may include a pixel value for each pixel of the captured first image. Additionally, the first image may also include a specular reflection of a first aspect of the specimen. The method also includes receiving second image information corresponding to a second image captured by the image capturing device. The second information may include a pixel value for each pixel of the captured second image. Additionally, the second image may include a specular reflection of a second aspect of the specimen. The method then includes comparing a first plurality of pixel values of the captured first image with a corresponding second plurality of pixel values of the captured second image and determining, for each pixel of the first plurality of pixel values, whether a selected pixel from the first plurality of pixels or a corresponding pixel from the second plurality of pixel values has a higher pixel value. The method in this aspect may then include storing in a pixel value set the pixel value of the selected pixel from the first plurality of pixels if the selected pixel has a higher pixel value than the corresponding pixel from the second plurality of pixel values, or storing in the pixel value set the pixel value of the corresponding pixel from the second plurality of pixels if the corresponding pixel has a higher pixel value than the selected pixel from the first plurality of pixels. In this aspect, the pixel value set provides an integrated image of the specimen.

BRIEF DESCRIPTION OF THE DRAWINGS

FIG. 8 is a flowchart of an exemplary disclosed image capturing process that may be implemented using the system of FIG. 1 and the holding fixture of 5 for capturing images of latent evidence.

DETAILED DESCRIPTION

Figure 1:
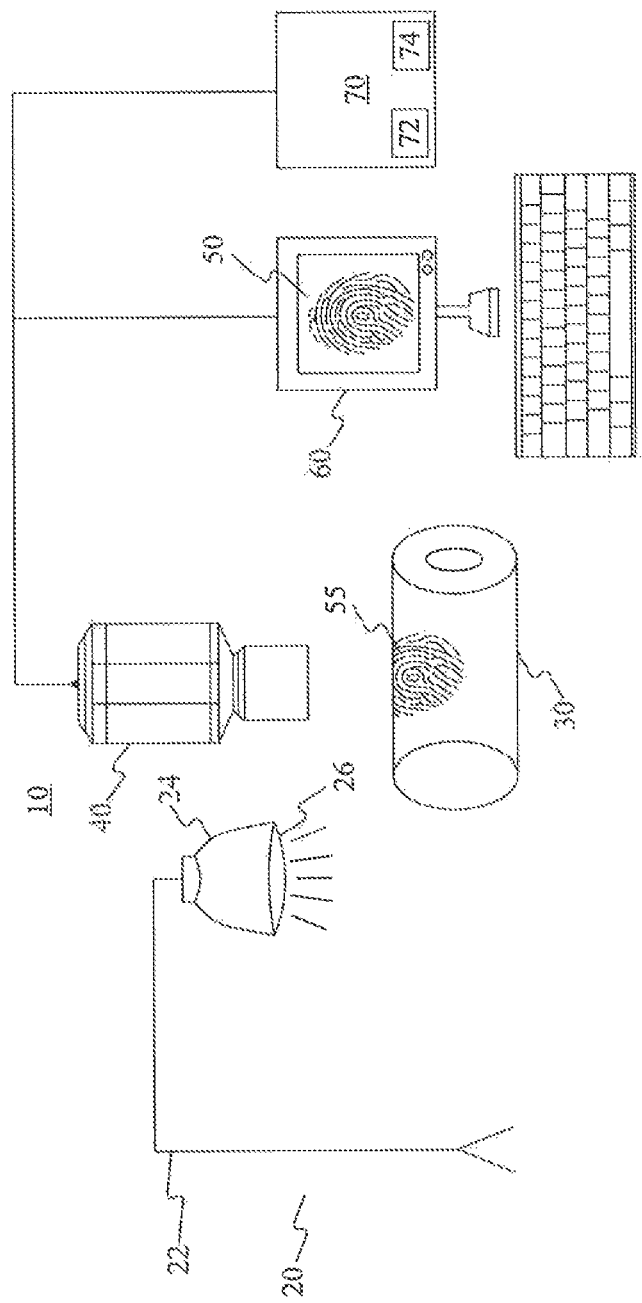
FIG. 1 is a diagrammatic illustration of an exemplary disclosed imaging system for capturing images of latent evidence.

FIG. 1a provides a diagrammatic representation of an imaging system 10 having a light source 20 configured to illuminate subject 30. In the illustrated embodiment, light source 20 is a standalone source including a stand 22, a housing 24 connected to and supported by stand 22, and a bulb 26 housed in housing 24. Any other suitable configuration for light source 20, however, may also be used depending on the requirements of a particular application. In some embodiments, light source 20 may include a UV lamp configured to direct UV radiation toward subject 30 thereby illuminating a specimen of latent evidence 55 contained on subject 30. In some applications of use, latent evidence 55 may include a fingerprint or a handprint, and subject 30 may include any object, including those with curved or irregular surfaces, such as a cylindrical object, as shown. Imaging system 10 may include an image capturing device 40, a display 60 for displaying a captured image 50, and a computing device 70 configured to process captured image data received from image capturing device 40 using one or more processors 72. Computing device 70 may also be configured to store captured and processed image data in or more storage modules 74. In some embodiments, image capturing device 40 may include a UV sensitive camera configured to capture one or more captured images 50 of a specimen of latent evidence 55 disposed on the surface of subject 30. In those embodiments, light source 20 may preferably include a UV lamp emitting UV radiation within a spectral range of the UV sensitive camera. Imaging system 10 may be used in a lab (as shown), on location at a crime scene, or at any location for collecting or capturing forensic evidence, in one embodiment, imaging system 10 may be a stationary system such that forensic evidence, e.g., subject 30 containing latent evidence 55, may be transported to imaging system 10 for analysis. In other embodiments, imaging system 10 may be transportable to a location of subject 30.

Light source 20 may include a UV light. In some embodiments, light source 20 may include a mercury UV lamp, including for example, a linear mercury gas discharge tube operating in the UV spectrum. One skilled in the art will recognize, however, that light source 20 may include any other type of UV light emitting device such as, for example, a deuterium light, a black light tube or bulb, a short wave UV lamp, a UV light-emitting diode, a UV laser, or a UV LED light. In one embodiment, light source 20 may be configured to emit UV radiation at least at a wavelength of 254 nm at a power rating between 1 and 50 watts depending on the size of subject 30 and distance of image capturing device 40 from subject 30. Light source 20 may be configured to emit UV radiation continuously or in pulses. While the disclosed embodiments refer to a light source 20 emitting UV radiation, other embodiments may utilize a light source producing light of any desired spectrum, such as visible or infrared.

In the illustrated embodiment, light source 20 is a standalone lamp; however, light source 20 may be connectable to image capturing device 40 via an adjustable or fixed connecting member (not shown). Stand 22 may be configured to fixedly position light source 20 to emit UV radiation towards subject 30 at a specific angle such as, for example, looking down roughly perpendicular to the surface of subject 30 (as shown) or from the side roughly parallel to the surface of subject 30. Alternatively, stand 22 may be adjustable such that light source 20 may be positioned to emit UV radiation towards subject 30 at a variety of angles so as to form an angle between the light emitted by light source 20 and the surface of subject 30 between about zero to 180 degrees. Stand 22 may be bendable and connectable to housing 24 such that housing 24 and bulb 26 may be rotatable in the x, y, and z planes. Light source 20 may be connectable to an independent power source (not shown) via, for example, a 110 volt wall plug, or may include an internal battery (not shown) to power bulb 26. Alternatively, light source 20 may be connectable to the display 60 or computing device 70 and may be powered via these devices.

The disclosed embodiments may utilize any combination of a light source 20 and an image capturing device 40 configured, alone or with the aid of additional filters (not shown), to capture an image in the spectral range of the light source 20. Certain embodiments, however, may include a light source 20 configured to emit UV radiation and an image capturing device 40 configured to capture an image illuminated by such UV radiation. UV radiation in these embodiments may correspond to light with a wavelength from 100 nm to 400 nm, and may preferably correspond to light with a wavelength of about 254 nm.

As UV radiation from light source 20 contacts subject 30, the UV radiation may be either reflected or absorbed by the surface of subject 30. Reflections from various surfaces may generally include specular reflections and diffuse reflections. For example, a specular reflection may result when the light from light source 20 is uniformly reflected from the surface of subject 30. The uniform reflection of individual rays of light from a surface creates a kind of glare or mirror like reflection of the light. A diffuse reflection, on the other hand, includes the non-uniform reflection of light from a surface, such as when individual rays of light are reflected in different directions from the surface. A diffuse reflection typically results from a reflection from a rough or irregular surface, whereas a specular reflection may result when light is reflected from a smooth surface. In many instances, a latent fingerprint may be positioned on various reflective surfaces such as that of a wine glass, aluminum can, bullet casing, a writing instrument and many others. In some embodiments, aspects of the latent fingerprint can be captured from the specular reflection of the latent fingerprint when illuminated by a light source.

When capturing an image of a latent fingerprint on subject 30, a specular reflection (or substantially specular reflection) may result in aspects of the latent fingerprint being reflected with greater intensity than those aspects represented by solely diffuse reflections. Aspects of the disclosure include methods and systems for capturing the specular reflection and the aspects of a latent fingerprint detectable in the reflection. In the disclosed embodiments, light source 20 may be positioned at a particular angle relative to a surface of subject 30 to produce a specular reflection that may be captured by image capturing device 40. Upon capturing the specularly reflected light by image capturing device 40, aspects of the latent fingerprint may appear in a captured image with greater intensity than other aspects not specularly reflected. The intensity of light source 20 and other parameters of image capturing device 40 may be controlled to capture an image of the latent fingerprint based on the collection of specularly reflected rays. Of course, an image may be generated even if not all of the collected rays result from specular reflections. An image of latent fingerprint evidence may also be based, at least in part, upon collected rays resulting from diffuse reflections. As previously noted, however, light captured from specular reflections can increase the intensity and contrast of collected image data. Thus, as the amount of light available from specular reflections increases, the quality of the image data available for analysis may also increase.

In the illustrated embodiment, subject 30 may include a specimen of latent evidence such as a latent fingerprint that remained after a human hand contacted the surface of subject 30. However, subject 30 may include any type of latent evidence 55 and may vary in size such as, for example, a portion of a single fingerprint or multiple fingerprints and palm prints. Subject 30 may include fresh or aged forensic evidence. Subject 30 may also include multiple layers of forensic evidence overlaying one another.

Once subject 30 is exposed to UV radiation or during such exposure from light source 20, image capturing device 40 may capture an image 50 of a specimen of the latent evidence 55. In the illustrated embodiment, image capturing device 40 may be positioned looking down on subject 30 at an angle roughly perpendicular to a surface of subject 30. However, image capturing device 40 may also be positioned at a range of angles relative to subject 30. Image capturing device 40 may be held by a user (not shown) or fixedly or adjustably positioned by an overhead stand (not shown) or tripod (not shown) or any other known structure. In one embodiment, the angle at which image capturing device 40 views subject 30 may be adjustable to view the subject from a range of angles relative to the subject 30. A range of angles may include any angle at which the image capturing device 40 may be able to capture a specularly reflected image from the surface of subject 30.

In some embodiments, the image capturing device 40 may be located at a fixed position and/or orientation relative to subject 30. In such embodiments, the image capturing device may maintain a certain viewpoint relative to subject 30 while capturing multiple images. Such an arrangement may facilitate an image integration process, discussed in more detail below.

As shown in FIG. 1, image capturing device 40 may be fixedly connectable to display 60 and computing device 70 to transmit and store captured image data as well as receive power. Alternatively, image capturing device 40 may be connectable to an independent power source (not shown) via, for example, a 110 volt wall plug, or may include an internal battery (not shown) to power image capturing device 40. Image capturing device 40 may receive direct or alternating current. Image capturing device 40 may also be in communication with display 60 and computing device 70 remotely or over a local wireless network (not shown). Image capturing device 40 may include any device capable of capturing an image, whether still or video, such as a digital camera or a digital video recorder.

Display 60 may be configured to receive and display captured images 50 of latent evidence 55 from image capturing device 40 as shown. Display 60 may include a monitor, provided alone or as part of a monitor for a computing device 70, such as a desktop computer. In one embodiment, display 60 may include computing device 70, such as an all-in-one computer, or a laptop computer. In another embodiment, display 60 may be provided as part of image capture device 40. In other embodiments, display 60 may include any device configured to display digital video or still images, such as, for example, a camera display, a cellular phone display, or a television, etc. Display 60 may vary in size based on the type of device and the image quality preferred. Based on the type of device, display 60 may be mobile or stationary. For instance, a laptop computer or cellular phone may be transportable to a crime scene whereas a stationary desktop computer may remain in a lab.

Display 60 may be connected (directly or indirectly) with image capturing device 40 and computing device 70. In one embodiment, display 60 may be configured to display captured images 50 stored in storage modules 74 (provided separate from or as part of computing device 70) via, for example, a wired connection or remotely over a wireless network (not shown). Examples of various wired and wireless data connections include USB, FireWire, IEEE 1394, Camera Link, GigE, Bluetooth, and Wi-Fi. But any wired or wireless technology may be utilized in the disclosed embodiments.

Computing device 70 may include one or more processors 72 configured to control the functions of image capturing device 40, including, for example, instructing image capturing device 40 to capture images 50, processing captured image data, sending captured images 50 to display 60 and storing the captured images and image data in storage modules 74. Computing device and/or processors 72 may include any suitable device for executing logic instructions, including, for example, microprocessors (e.g., those available from Intel, AMD, etc.), digital signal processors, integrated circuits, logic gate arrays, etc.

In some embodiments, computing device 70 may be configured to control the functions of display 60, including, for example, selecting which captured images 50 are to be displayed. In yet another embodiment, computing device 70 may be configured to control the functions of storage modules 74, including, for example, selecting a filename and storage location for captured images 50. Computing device 70 may be equipped with one or more various inputs such as, for example, a keyboard, mouse, or touch screen.

Computing device 70 may include storage modules 74, which may include any device, unit, or media capable of storing captured image data. In some embodiments, storage modules 74 may be internal to the computing device, or may otherwise include external storage, such as an external hard drive of a computer, or flash drive or other external or removable storage devices. Storage modules 74 may also include for example, internal computer memory, internal camera memory, a removable memory device, or a writable disc. Depending on the type of system, storage modules 74 may be mobile or stationary. For instance, an internal camera memory may serve as storage module 74 and may be transportable with image capturing device 40 to a crime scene, whereas an external hard drive may remain stationary in a lab.

In one embodiment, image capturing device 40 may include a digital RUVIS camera, such as that disclosed in commonly assigned and co-invented U.S. patent application Ser. No. 14/070,328, filed on Nov. 1, 2013, the contents of which are expressly incorporated herein in their entirety. In this embodiment, image capturing device 40 may be configured to receive UV radiation from a light source 20 emitting UV light reflecting off of subject 30 and illuminating a specimen of latent evidence 55.

Image capturing device 40 may include optical filters configured to filter the reflected UV radiation of a desired wavelength. For example, image capturing device 40 may be configured with a bandpass filter designed to filter UV radiation entering image capturing device 40 at a passband centered at about 254 nm and a bandwidth of about 1 nm to about 100 nm. In another embodiment, a bandpass filter may be configured to filter light centered at a different passband or bandwidth depending on the latent evidence being captured and the light source utilized. Additionally, one or more other optical or filters may be used to produce other effects as desired. Alternatively, or additionally, image capturing device 40 may include a digital filter to achieve a similar result during pre-processing of a captured image. Image capturing device 40 may also include a lens with a variable aperture or a small fixed aperture that will operate over the spectral range of the image capturing device 40 and provide a suitable depth of field. Image capturing device 40 may include a digital image sensor configured to receive UV radiation entering through a lens of the image capturing device. In the disclosed embodiments, an image sensor may be configured to produce digitized image data of the received UV radiation. Image capturing device 40 may also be configured to include one or more software controlled processors for processing the received UV radiation and generating digital image data suitable for display on display 60 as well as performing other processing techniques according to the embodiments of this disclosure. Image capturing device 40 may also include other processing components configured to generate an electrical output of the image data that may be converted to a video display signal for displaying the captured image data. Additionally, image capturing device 40 may be configured to capture still digital images or video images. Image capturing device may also be configured to include processing capability to identify and grab individual frames of captured video images for processing in a manner similar to still images.

An image sensor of image capturing device 40 may include a full frame 35 mm format size charge-coupled device ("CCD") imager, a complementary metal-oxide-semiconductor ("CMOS"), charge injection device ("CID"), or other image sensing technology. The topologies of the CCD, CMOS and CID imagers are well understood by those skilled in the art of camera electronics as are any associated capture electronics required by each.

Image capturing device 40 may be configured to process image data in 8 bit, 10 bit, 12 bit, 14 bit, 16 bit or other data format. In some embodiments, the image data may be generated as 8 or 16 bit monochrome or gray scale format. In such embodiments, the image data may include a value for each sensor pixel as a single sample indicating intensity information of the light received for that pixel. For example, the pixel values included in the image data may include values representing shades of gray, varying from black at the weakest intensity to white at the strongest intensity. In this embodiment, the stronger the intensity of the light received at the pixel, the greater the pixel value. In other words, in an 8 bit embodiment, the range of gray scale values may be represented by a value from 0 to 255, 0 representing black and 255 representing white. The image data may be stored in RAW format (unmodified) or in any other format suitable for the processing techniques of this disclosure. In another embodiment, the image data of UV images 50 may be captured in 24 or 32 bit color format. Post-processing of image data may be performed by image capturing device 40 or computing device 70 to convert any format of the captured image data to a gray scale format utilized in the disclosed embodiments.

The disclosed imaging system 10 of FIG. 1, in one embodiment, may be implemented into any imaging application that captures images in the UV spectrum. Imaging system 10 may be configured to generate high resolution images at a size greater than 2 inches by 2 inches at a resolution of at least 1000 pixels per square inch, thereby decreasing the risk of capturing a partial fingerprint or smudge and enabling the capture of an entire palm print or handprint. The disclosed imaging system 10 may provide a live image of forensic evidence prior to developing and lifting the evidence, allowing an investigator to focus only on evidence that has forensic value. Additionally, the disclosed imaging system may allow for this live image to be instantly captured and digitally saved. In the disclosed embodiments multiple images may be captured, each one utilizing specular reflection of a particular aspect of a latent fingerprint, for example. The multiple images may be integrated in real-time during the capture of the latent fingerprint and displayed to an operator of the system enabling the operator to determine when desired aspects of the latent fingerprint or a complete image of the latent fingerprint has been captured. In other embodiments, multiple images may be integrated later during post-processing of the captured images to generate an integrated image of captured aspects of the latent fingerprint.

Figure 2:
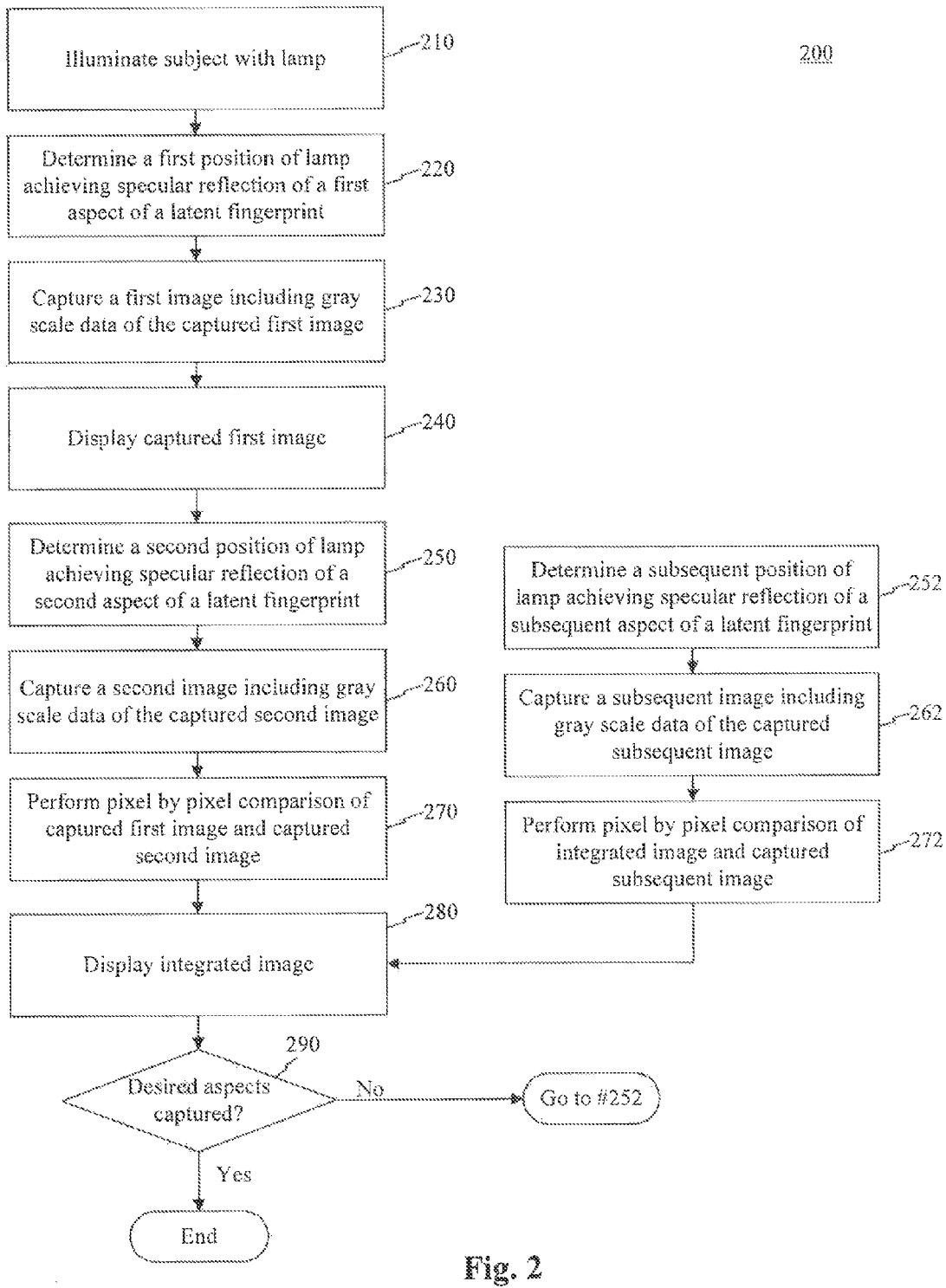
FIG. 2 is a flowchart of an exemplary disclosed image capturing process that may be implemented using the system of FIG. 1 for capturing images of latent evidence.

Operation of imaging system 10, according to some embodiments, will now be described. FIG. 2 shows a flowchart of a disclosed embodiment of an image capturing process 200 for capturing and forming an integrated image of a specimen of latent evidence, such as a latent fingerprint. In some embodiments, an image of a latent fingerprint 55 of suitable detail may be captured in a single image. In other embodiments, however, where subject 30 comprises a cylindrical object or an object with an otherwise irregular surface, for example, only a partial aspect of the latent fingerprint 55 may be captured. This may be because only a partial aspect of the latent fingerprint may be visible in a single image or frame or because the reflected light may not evenly illuminate the latent fingerprint, for example. In such embodiments, some aspects of the captured image may be too bright and others too dim, resulting in an unusable image for forensic purposes. Such an image may be unusable because not all desired aspects of the latent fingerprint may be captured with sufficient detail in a single image.

Thus, image capturing process 200 includes the integration of specularly reflected aspects of the specimen captured in a plurality of images to form a single, composite integrated image. As described below, multiple images detailing various aspects of the latent fingerprint may be captured and then integrated to achieve the composite image. As part of process 200, a light source may be repositioned between the multiple images to illuminate the various aspects of the fingerprint to be captured. In other words, different portions of the latent fingerprint may be illuminated by moving the light source 20 around the subject 30. This causes aspects of the latent fingerprint from previously non-illuminated areas on a curved or irregular surface of the subject 30 to become illuminated. The illuminated aspects of the latent fingerprint may contain the desired detail to capture in the image. These illuminated aspects are then captured by an image capturing device 40 in multiple images as the light source 20 moves around the subject.

As part of an integration process, a pixel value comparison may be performed between captured images to determine which corresponding pixels are brighter (thus containing the desired detail of the specular reflection). In each comparison the brightest pixels are then maintained in a pixel value set representing an integrated image. Thus, process 200 may produce an integrated image pixel value set by filling in areas of an N×M image with the brightest pixel values from the comparisons. The integrated image may include an evenly illuminated representation of the latent fingerprint captured over multiple images. These operations are described in greater detail below.

As part of operation 210, a subject 30 containing a specimen, such as a latent fingerprint 55, may be illuminated by light source 20. Subject 30 may include a reflective surface that enables a specular reflection of the light provided by light source 20. As part of operation 220, a first position of light source 20 may be determined to generate a specular reflection of a first aspect of the latent fingerprint 55 provided on the surface of subject 30. The desired position of the light source may be automatically determined and/or adjusted (e.g., using one or more servo motors, guide tracks, etc.) by the imaging system 10. Additionally, in some embodiments, imaging system 10 may allow for a user to position the light source 20. Though not shown as part of process 200, an image capturing device 40 may also be provided and configured to capture an image of the specularly reflected aspect of the latent fingerprint. Additional aspects of operation 220 for positioning light source 20 as well as additional details for configuring the image capturing device 40 are described in further detail regarding FIG. 3 below.

Once light source 20 and image capturing device 40 are positioned and configured to capture a desired specular reflection of the latent fingerprint, image capturing device 40 may be controlled as part of operation 230 to capture a first image. The captured first image may include image data comprising gray scale data of the captured first image. As discussed above, image capturing device 40 of the disclosed embodiments may include the necessary processing components to digitize the captured image into a gray scale image in which each pixel of image data includes a value corresponding to a gray scale value.

The captured image data may be processed and output for suitable display on display 60 according to operation 240. The image data may be provided directly from image capturing device 40 or from computing device 70. In one embodiment, a user may be able to view the captured image 50 in real-time on display 60. This embodiment enables the user to immediately identify how much or which aspect of the latent fingerprint 55 has been effectively captured by image capturing device 40. Operation 240, however, is optional. In another embodiment, processing of the image data by an image capture device 40 or a computing device 70 may be able to determine how much or which aspect of the latent fingerprint has been captured. Thus, there may be no need to display the captured image. Additionally, there may be embodiments that do not include a display, such as when image capturing device 40 itself does not include a display and is transported to a location of subject 30.

Where multiple images may be useful to capture various desired aspects of a latent fingerprint in sufficient detail, process 200 may continue to operation 250. As part of operation 250, a second position of light source 20 may be determined to achieve specular reflection of a second/different aspect of the latent fingerprint 55. In one embodiment, image capturing device 40 and subject 30 may remain stationary while light source 20 may be adjusted to achieve a specular reflection of the second/different aspect of the latent fingerprint. For example, light source 20 may be adjusted to achieve a specular reflection from another part of the surface of object 30 containing the second aspect of the latent fingerprint.

In one embodiment, imaging system 10 may be configured to automatically determine an appropriate position of light source 20 to reflect the desired aspect of the latent fingerprint. In another embodiment, imaging system 10 may enable a user to position a light source to achieve the desired reflection. In such an embodiment, a real-time or in situ image may be acquired and shown on display 60. The real-time image may enable a user to determine a second position of light source 20 to capture the desired aspect of the latent fingerprint. For example, in one embodiment, an image capturing device 40 may be provided to display the field of view of the image capturing device 40 without capturing an image.

In operation 260, image capturing device 40 may be controlled to capture a second image including a specularly reflected second aspect of the latent fingerprint. Similar to operation 230, the captured second image may include second image data comprising gray scale data of the captured second image. Operation 260 may be automatically performed by imaging system 10, or may be performed upon direction of a user.

Figure 4:
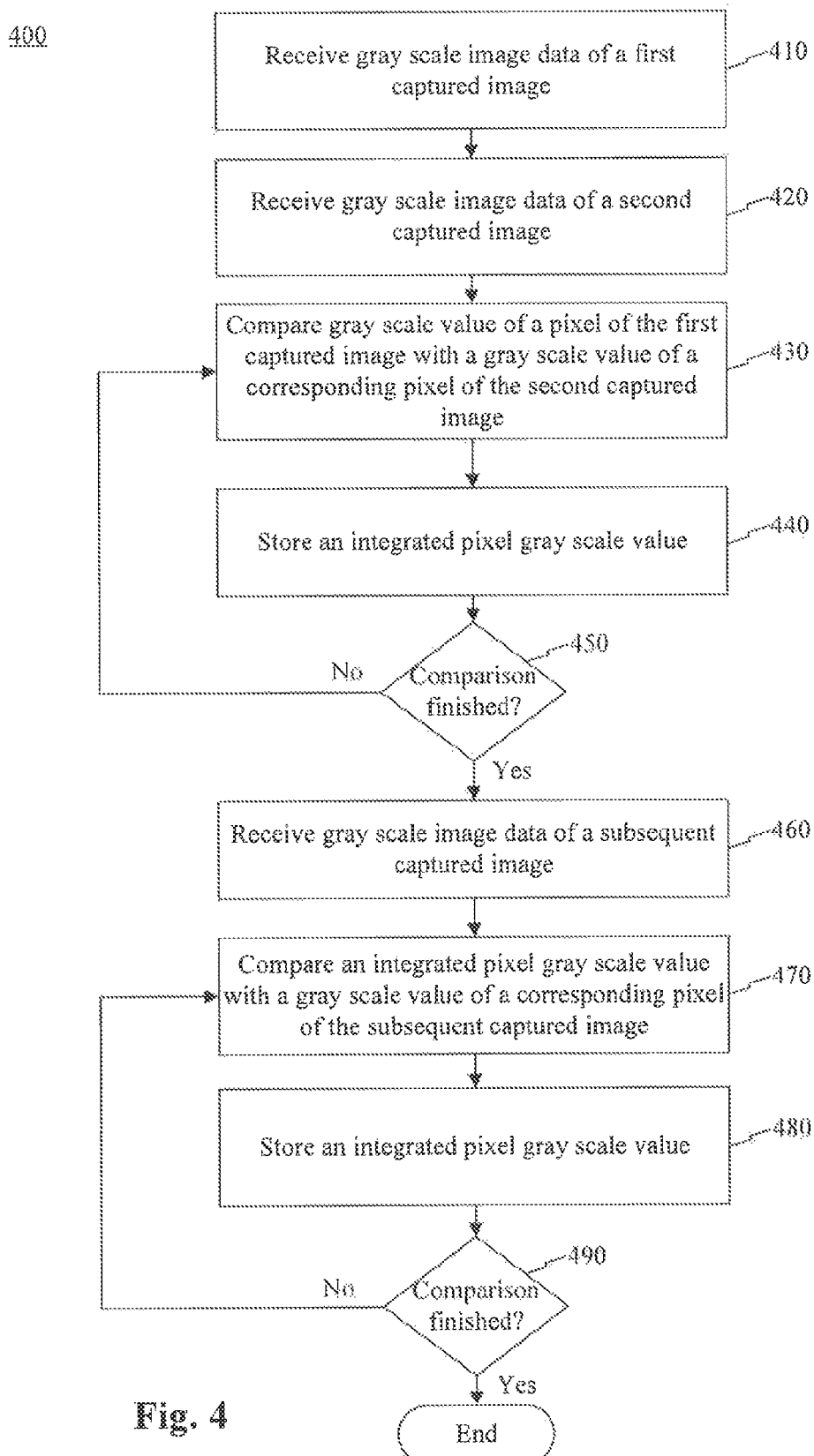
FIG. 4 is a flowchart of an exemplary disclosed integration process that may be implemented using the system of FIG. 1 for capturing images of latent evidence.

As part of operation 270, an integration process 400, as shown in FIG. 4, may be performed to integrate the captured first image and the captured second image. As shown in FIG. 4, gray scale data of the captured first image may be compared with the gray scale data of the captured second image. In one embodiment, this operation may be performed on a pixel by pixel basis for a plurality of corresponding pixels of the captured first image and the captured second image. As part of the comparison in operation 270, a subset of the corresponding pixels may be determined for the comparison. The pixel comparison operation may be performed by the processing capability of image capturing device 40 or an integral or connected computing device 70. The comparison of the plurality of pixels of the first and second images produces a pixel value set corresponding to an integrated image. Various processing algorithms may be utilized to perform the comparison yielding an integrated image, as described in detail with respect to FIG. 4

As part of process 200, the first and second images may be overlayed onto each other, and the brightest pixel values of the compared corresponding pixels between the first and second images may be maintained in a pixel value set representing the integrated image. In this embodiment, because only the angle or position of the light source 20 has changed (i.e. the subject 30 and image capturing device 40 remain in a fixed position relative to each other), the captured images can be mapped such that corresponding pixels in the captured images correlate to identical aspects of the latent fingerprint. Thus, integration of multiple captured images can be performed without requiring stitching of the various aspects captured in multiple images to piece together a composite image. The integration process is described in greater detail below with respect to FIG. 4

As part of operation 270, the comparison of a plurality of corresponding pixels may produce a pixel value set representing an integrated image. As part of operation 280, the integrated image may then be displayed on display 60. This operation is optional. As discussed above with respect to operation 240, in some embodiments, a display 60 may not be present during the capture of the multiple images.

As part of operation 290, a decision may be made as to whether the integrated image includes the desired aspects of the latent fingerprint 55 or otherwise completely captures the latent fingerprint 55. Because specular reflection may be utilized to uncover the latent fingerprint 55, the greatest pixel values may correspond to those brightest aspects of the latent fingerprint that are specularly reflected from the surface of subject 30. Over time, by subsequently illuminating various aspects of the latent fingerprint to be specularly reflected, each part of the latent fingerprint may be captured. Once each aspect of the latent fingerprint is captured and combined with the integrated image, the integrated image may depict a more detailed image of the latent fingerprint 55 than may be captured in a single image. If the desired aspects of the latent fingerprint have been captured, based on the determination in operation 290, process 200 may end.

In one embodiment, the determination in operation 290 may be made by a user operating an imaging system 10. For example, imaging system 10 may enable a user to determine from the displayed integrated image 50 (optional operation 280) whether the latent fingerprint 55 has been captured with the desired completeness and detail in the integrated image.

In another embodiment, operation 290 may be performed by processing components provided in image capturing device 40 or provided as part of computing device 70. In this embodiment, one or more processors may be configured to determine a summed value of the pixels of the integrated image. A sum above a certain threshold value may indicate that the desired aspects of the latent fingerprint have been captured. The processors used for performing operation 290 may also be configured to assign various weighting values to certain pixels of the integrated image prior to the summing operation to emphasize the center or other aspects of the integrated image. Any other method may also be used to determine whether the desired aspects of the latent fingerprint have been captured.

For example, the determination in operation 290 may be based on other factors such as the number of captured images and/or a range of movement of light source 20. In one embodiment, the desired range of movement of light source may be pre-determined or chosen based on the nature of subject 30 or the nature of the latent fingerprint or hand print, for example. In this embodiment, operation 290 may determine whether light source 20 has illuminated the subject 30 in each of the desired positions within the pre-determined or selected range of movement. The range of movement of light source 20 may be automatically configured using one or more servo motors or other device for automating the movement of light source 20. For example, imaging system 10 may be configured to control and determine a position of light source 20 and may operate the light source through a predetermined range of movement, such as, for example, 0 to 180 degrees or any other range as may be determined based on the curvature of the subject 30 and the position of a latent fingerprint on subject 30. Operation 290 may determine whether to end process 200 based on whether the light source has completed the range of motion. Additionally, an image may be captured for each position of the light source 20, thus, the range of movement of light source 20 may correspond to a desired number of captured images. Thus, operation 290 may determine that the desired aspects have been captured based on the number of images captured.

If the user or the one or more processors determine that the integrated image includes the desired aspects of the latent fingerprint on the surface of subject 30, or based on other factors described above, image capturing process 200 may end. The integrated image may then be stored for any follow-on post-processing, such as contrast and brightness adjustments, gamma adjustments or background pattern removal, for example, or other techniques to further enhance aspects of the captured integrated image. The integrated image may be stored on a removable storage module or transferred to other entities for follow on forensic work utilizing the integrated image. The integrated image may be stored as a file with the same size as each of the captured images because the integrated image contains the same number of pixels as the captured image, with an updated pixel value based on each comparison. Having the same file size may offer advantages in certain situations, such as post-processing etc.

If the determination in operation 290 concludes that desired aspects of the latent fingerprint may have not yet been captured, the process proceeds to operation 252 which begins another iteration of the above process 200. In this manner, the imaging system in operation 252 may allow for adjustment of the position of light source 20 to capture subsequent aspects of the latent fingerprint that have yet to been specularly reflected and captured by image capturing device 40. For, example, in operation 252, a subsequent position of light source 20 that achieves specular reflection of an aspect of the latent fingerprint that has yet to be captured by image capturing device 40 may be determined. This subsequent position may be based on a predetermined or preselected range of motion of light source 20 or may be determined by a user operating imaging system 10. Once the light source 20 is appropriately positioned, image capturing device 40 may again capture image data in operation 262. Again, image capturing device 40 captures subsequent image data comprising gray scale data of the captured subsequent image, similar to operations 230 and 260. In operation 272, a comparison similar to operation 270 is performed between the captured image and the previously integrated image. Operation 272 may include an integration process 400, as shown in FIG. 4, which operates to integrate the subsequent image data with the previously integrated image data that may be displayed in optional operation 280. As shown in FIG. 4, gray scale data of the subsequent captured image may be compared with the gray scale data of the previously integrated image from operation 270. This comparison creates a new integrated image that includes integration of the first, second and subsequent images and may then be displayed in optional operation 280.

Thus, each subsequent image captured in process 200 may be integrated into the previous integrated image. After each subsequent image capture, the process may again determine in operation 290 whether the desired aspects of the latent fingerprint have been captured. As discussed above, in one embodiment, the imaging system 10 may enable a user to continuously view the progress of the latent fingerprint integration until a desired integrated image may be achieved. Process 200 may continue in this manner until a determination is made in operation 290, based on any of the above described factors, that the integrated image includes the desired aspects of the latent fingerprint or may otherwise be satisfactory for its purpose.

While image capturing process 200 is shown as discreet operations, the above process may be performed in a continuous seamless operation using a digital video signal captured by image processing device 40, for example. Thus, in one embodiment, the captured first, second, and subsequent images in operations 230, 260, and 262, may include still digital images captured by image capturing device. In another embodiment, the captured first, second, and subsequent images in operations 230, 260, and 262 may include first, second, and subsequent frames grabbed from a video signal captured by image capturing device 40. Process 200 may conclude after the capture of any number of images or frames, from three frames, ten frames or any other number of frames up to 1000 or more.

Imaging system 10, performing process 200, may also enable a user to see a live view of what the image capturing device 40 is capturing during operations 260 and 262, for example. Alternatively, at the selection of a user, each captured image may be displayed as well as the resultant integrated image. Imaging system 10 may enable a user selection to automatically integrate each new frame captured by image capturing device 40, or alternatively integration may be performed one from at a time under selection and control of a user or based on some other determination made by imaging system 10. Additionally, while one advantage of the process 200 provides real-time display and determination of an integrated image, a process similar to 200 may be used for post-processing a plurality of images, either still or video frames, for creating an integrated image.

In another embodiment, imaging system 10, performing process 200 may enable a user to actively select which captured images are to be integrated into an integrated image. For example, referring to FIG. 2, provided as part of operation 240, imaging system 10 may enable a user to view the first image captured by image capturing device 40 and determine whether the image should be rejected from the integration process. Thus, in this embodiment, a user may have greater control over the integration process and can selectively choose to integrate only those captured images that will yield a desirable integrated image. Additionally, in this embodiment, imaging system 10, in operation 260, may further enable a user to view the captured second image before deciding to perform the integration process with a first captured image. Thus, for example, if the captured second image, as viewed on a display 60 for example, does not provide a quality image of a particular aspect of the latent fingerprint, the imaging system may enable a user to reject that image and elect not to perform the integration process using that image data.

Additionally, in one embodiment each image captured by image capturing device 40, may be stored in storage module 74 along with a log identifying the results of each comparison of the captured image with an integrated image. In this embodiment, a log representing a history of process 200 may be maintained as a sort of chain of custody log for verifying the authenticity of an integrated image formed by process 200.

In yet another embodiment, similar to process 200, a latent fingerprint may be similarly captured in a single image using imaging system 10. As discussed above, with respect to the image capturing process 200, the integrated image may be formed by moving light source 20 at different angles to specularly reflect aspects of the latent fingerprint frame by frame or image by image. In another embodiment, a similar method may be performed by similarly moving light source 20 at different angles to specularly reflect different aspects of the latent fingerprint all within a single exposure. Thus, within a single exposure or extended frame, the entire latent fingerprint may be illuminated and captured at some interval within the exposure forming a single image. Accordingly, it may be feasible to capture a suitable image of the latent fingerprint in this manner. This embodiment, however, requires the user or the imaging system 10, if automated, to evenly (or more evenly) illuminate each aspect of the latent fingerprint while adjusting the angle of the light radiating from light source 20. Otherwise, some aspects of the single exposure captured image may be overly exposed while others are underexposed, resulting in a lower quality image.

The following discussion describes an illumination method 300 that may be used to configure a light source 20 and an image capturing device 40 to capture an image as described in process 200. For example, prior to or as part of operation 210, a light source 20 may be configured to emit light at a desired wavelength and intensity, and the image capturing device 40 may be configured to capture an image based on the configuration of light source 20.

Figure 3:
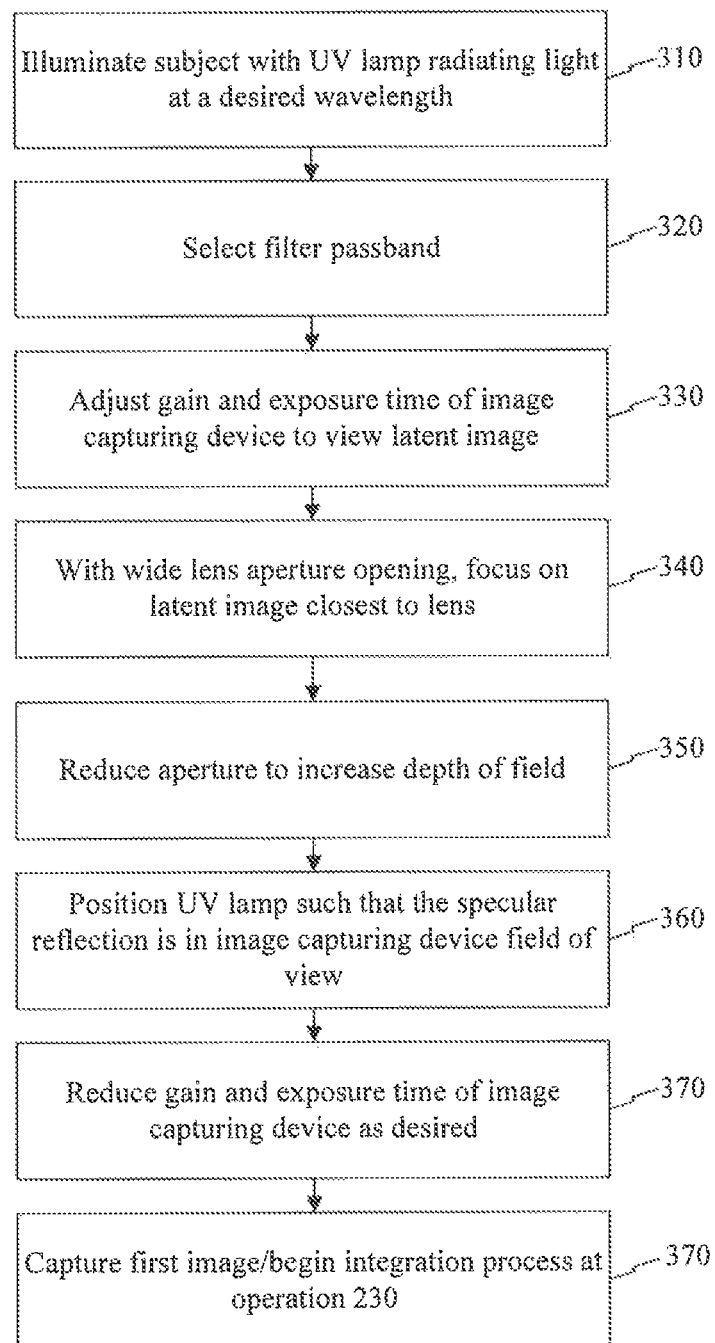
FIG. 3 is a flowchart of an exemplary disclosed illumination process that may be implemented using the system of FIG. 1 for capturing images of latent evidence.

FIG. 3 represents and exemplary illumination method 300 for illuminating latent evidence, such as a latent fingerprint, for capture by image capturing device 40 using imaging system 10. While the following discussion details a particular method of illuminating a latent fingerprint using a UV lamp providing light at a particular wavelength, the following discussion is by example and any other suitable spectrum of light at a desired wavelength may be utilized. In operation 310, a light source 20, such as a UV lamp may illuminate subject 30 with UV radiation. In response, subject 30 may reflect the UV radiation or absorb the UV radiation and fluoresce. The angle at which UV lamp 20 emits UV radiation onto subject 30 may be adjustable to obtain a desired reflection or fluorescing off of subject 30. For instance, at a first angle, light reflecting off of ridges in a fingerprint on subject 30 may appear white compared to a dark background. After adjusting UV lamp 20 to a second angle, light reflecting off of ridges in the fingerprint of subject 30 may appear bright compared to a darker background.

Image capturing device 40 may be configured to receive UV radiation reflecting or fluorescing off of subject 30 from UV lamp 20 as provided in part of operation 320. In this embodiment, image capturing device 40 may include a digital RUVIS camera, such as that discussed above. As part of the configuration operation 320, image capturing device 40 may be provided with an optical filter designed and selected for a desired wavelength of light radiating from UV lamp 20. For example, as discussed above, image capturing device 40 may be configured with a bandpass filter designed to filter UV radiation entering image capturing device 40 at a passband centered at about 254 nm and a bandwidth of about 1 nm to about 100 nm. In other embodiments, a filter of any other passband may be selected based on the configuration of light source 20.

The filtered UV radiation may be collected by an image sensor provided as part of the image capturing device 40. As image sensor 160 collects the filtered UV radiation, at least one controller included in image capturing device 40 may control gain and exposure time of image capturing device 40 to digitally capture images of the collected UV radiation as part of operation 330. Image capturing device 40 may include software instructions, executable by the at least one controller included in image capturing device 40 or an affiliated computing device 70, to adjust gain and exposure time. Additionally, image capturing device 40 may include software instructions for controlling other image data such as gamma, pixel binning, frame rate, integration time, image readout, and image reset to capture high resolution UV images according to the disclosed embodiments.

Once various parameters of image capturing device 40, such as the gain and exposure, have been set, image capturing device 40, in operation 340, may then be set to focus on an aspect of the latent fingerprint that may be closest to the lens of image capturing device 40. Focusing may be automatically performed by image capturing device 40 or alternatively may be performed manually by a user, by adjusting a focus ring of the image capturing device 40, for example. Image capturing device 40, in operations 330 and 340, may be configured with a lens aperture set to a wide opening to facilitate the configuration process. In this manner, various parameters of the image capturing device may be configured so as to enable the capture of a high resolution UV image. A lens of image capturing device 40, however, may include a fixed aperture that may not be capable of operating at different aperture openings. Thus, operation 340 may also be performed with a lens set at any aperture opening. In operation 350, once the latent fingerprint is in focus a lens of image capturing device 40 may be adjusted to have a smaller aperture opening, such as at an F/16 setting, for example. The reduced aperture of a lens enables image capturing device 40 to capture images of a latent fingerprint with an increased depth of field. This may be useful for capturing images on curved surfaces because certain aspects of the image to be captured may be appreciably farther from the lens of image capturing device 40, and thus may not be as sharply focused.

At operation 350, with the image capturing device focused on an aspect of the latent fingerprint, imaging system 10 may enable the positioning of the UV lamp at an angle such that specular reflection may be realized in the center of the image capturing device 40 field of view. The specular reflection preferably reflects the in-focus portion or aspect of the latent fingerprint. Once the latent fingerprint is specularly reflected, various parameters of image capturing device 40 may once again be adjusted to capture the specular reflection of the latent fingerprint as desired.

For example, as shown in operation 370, a gain and exposure time of image capturing device 40 may be reduced to capture an image of desired quality. Because of the specular reflection, aspects of the latent fingerprint may appear very bright. Image capturing device 40 may be configured in operation 370 to capture the specular reflection without saturating a sensor of image capturing device 40. Additionally, an intensity of the UV lamp 20 may be adjusted to further configure imaging system 10 to capture the desired detail of the latent fingerprint in the captured image. Image capturing device 40, as well as a UV lamp 20, may be configured in any manner to capture the desired detail of the latent fingerprint that may be specularly reflected. Operation 370 may include operating image capturing device 40 to capture test images to identify appropriate settings of image capturing device 40 prior to performing an integration process, such as that shown in FIG. 2. Once the image capturing device 40 is configured, the integration process described with respect to FIG. 2 may begin at operation 230.

Throughout the integration process 200, each of an intensity of UV lamp 20, configuration of image capturing device 40, and position of latent fingerprint with respect to the image capturing device 40 may remain fixed. In this manner, only the specular reflection of UV lamp 20 illuminating various aspects of a latent fingerprint should vary between captured images.

FIG. 4 shows a flowchart of an integration process 400 or algorithm for performing integration of multiple captured images of a latent fingerprint according to the disclosed embodiments. Referring to FIG. 2, in operations 230 and 260, for example, a first and second image may be captured by image capturing device 40. Image data of the captured images may include at least gray scale data for each pixel of the captured images representing the intensity of light received at each pixel of an image sensor provided in image capturing device 40. Other image data may also be received, such as information corresponding to a color of light received. The disclosed embodiments, however, may utilize the gray scale values of corresponding pixels to perform the integration process 400 shown in FIG. 4.

Integration process 400 may be performed by image capturing device 40 or computing device 70. In the disclosed embodiments, the integration process may be performed by one or more processors configured according to software instructions stored in image capturing device 40 or storage modules 74 of computing device 70. Alternatively, the processors and/or storage modules including the instructions may otherwise be accessible to image capturing device 40 or computing device 70, such as via a data connection, including the internet. Alternatively, image capturing device 40 and computing device 70 may include a particular processor preconfigured to execute the operations of integration process 400.

In operations 410 and 420, process 400 may receive gray scale image data for each pixel of the captured first image and the captured second image, as captured in operations 230 and 260, respectively. As discussed above, the gray scale image data may include a gray scale value representing the intensity of light received by an image sensor of image capturing device 40. In operation 430, a first comparison between a gray scale value of a pixel of the first captured image with a gray scale value of a corresponding pixel of the second or captured image is performed.

In one embodiment, operation 430 may compare the gray scale values between corresponding pixels of the two images. In this embodiment, the gray scale value of a first pixel of the captured first image may be compared to a first pixel of the captured second image. Operation 430 may then determine which gray scale value is greater. As discussed above, the greater the intensity of light received by a pixel of an image sensor, the greater the gray scale value. Because the disclosed embodiments capture the image information specularly reflected from a subject 30, the pixels corresponding to aspects of the latent fingerprint contained in the specular reflection will have a greater gray scale value. Thus, the comparison performed in operation 430 may identify the pixels that received the fingerprint information in the specularly reflected light. In operation 440, the gray scale value that was determined to be greatest between the two compared pixels as the gray scale value of an integrated pixel may then be stored.

As part of operation 450, a determination may be made as to whether the comparison of pixel values is finished. In one embodiment, operation 450 may determine whether all pixels of the captured first and second images have been compared in operation 430. If less than all pixels (or a desired subset) have been compared, then the integration process may then repeat operation 430. In another embodiment, integration process 400 need not compare every single pixel of the captured images. Thus, operation 450 may determine whether a desired plurality (less than all pixels) of the corresponding pixels has been compared. Thus, a predetermined or selectable subset of pixels of the captured images may be designated for the comparison in operation 430. The specimen of a latent fingerprint to be captured by image capturing device may not occupy an entire field of view frame of the image capturing device 40. For example, edges and corners of a captured image may not provide any useful information related to the latent fingerprint to be captured. Thus, in some embodiments, integration process 400 may be configured to compare only those pixels determined to make up aspects of the desired latent fingerprint to be featured in the integrated image.

Once the comparison process is determined to have finished, a pixel value set representing the integrated pixel values of the compared pixels will have been stored due to repeated operation 440. The stored integrated pixel value set may represent an integrated image. Operation 440 may store the integrated pixel values according to any suitable procedure. For example, operation 440 may store each integrated pixel value as new image data comprising an integrated image. Alternatively, operation 440 may overwrite image data corresponding to the captured first image to include the pixel value of a corresponding pixel of the captured second image that was determined to be of greater value. Other methods of effectively creating an integrated image in this manner may also be used. In the disclosed embodiments, the integrated image preferably includes about the same amount of data as any one captured image. Because only a single gray scale value may be stored for each pixel in the integrated image, the integrated image may offer the advantage of comprising about the same file size in storage as any other individual captured image.

If operation 450 determines that the comparison of pixel values of the first and second images is finished, integration process 400 may proceed to operation 460 which receives gray scale image data for pixels of a subsequent captured image. Operation 460 may also include a determination as to whether subsequent image data may be available. Upon receiving image data corresponding to a captured subsequent image, operation 470 may perform another comparison similar to operation 430. This time, however, the comparison may be performed between the integrated pixel values stored in operation 440 and the corresponding pixel values of the captured subsequent image. Operation 480 may then store as an integrated pixel gray scale value, the gray scale value that may be the greatest between the compared pixels. Operation 480 may overwrite the previous integrated gray scale value when a corresponding pixel of the subsequent image is greater, thus maintaining a single integrated image. Alternatively, new integrated image data may be formed. Thus, in this embodiment, after each comparison of subsequent images, a new integrated image may also be stored. This embodiment may be beneficial to catalog in sequence each of the integrated images performed in the image capturing process 200, thereby providing a history of the integration. Again, in a similar step 450, the integration process 400 may determine whether all or a certain plurality of pixels of the integrated image and the subsequent image have been compared.

In this embodiment, because an integrated image may be modified only to include new pixel data of the pixels that have a greater value in the subsequent image, all previous integrated image data remains the same. Thus, because an intensity of light source 20 remains fixed, those aspects of a latent fingerprint that have been specularly reflected and captured will likely (but not necessarily) remain unchanged throughout successive iterations of the integration process.

Additionally, while integration process 400 discloses a pixel by pixel comparison of image data from two captured images, other similar methods may be performed to create a similar integrated image. The integration process 400 shown in FIG. 4 may enable real-time live display of the integrated image for the benefit of the user operating imaging system to ensure complete capture of the latent fingerprint. The integration process 400, however, may be part of a post-processing routine to integrate multiple images previously captured by image capturing device 40. For example, integration process 400 may be configured to perform a comparison of more than one image in a single operation. Thus, the greatest pixel value between a plurality of images may be stored as an integrated pixel value.

Other integration processes are also contemplated. For example, in operation 430, the comparison operation may include a summing or averaging integration operation. In a summed integration mode, corresponding pixel data from the one or more captured images may be added together to form integrated pixel data. In this method, an overall brighter integrated image may be formed that becomes increasingly brighter as additional captured images are summed. To prevent all pixels from becoming saturated at full pixel brightness, imaging system 10 may be configured to stop the summed integration mode when an integrated image reaches a desired or predetermined intensity. Additionally, other processing techniques may be used for preventing the oversaturation of an image in this embodiment. Alternatively, the imaging system 10 may be configured to enable a user selection to stop the summed integration when the integrated image reaches a desired intensity.

In an averaged integration mode, corresponding pixel data of the two or more captured images may be averaged by adding the gray scale values together and then dividing by the number of images being compared. In this manner, the integrated image may be formed incrementally, providing greater control for the user or imaging system 10 relative to the summing embodiment. A user may selectively end the integration process when the integrated image reaches a desired intensity. Alternatively, the integration process may be configured to stop the averaged integration mode when the integrated image reaches a predetermined level of intensity.

In some embodiments, subject 30 with a latent fingerprint thereon may include a cylindrical object of a small diameter. Certain small diameter objects, such as a bullet shell casing, battery or pen, create additional challenges in capturing a latent fingerprint that may not be experienced with larger diameter objects such as a wine glass etc. For example, certain aspects of a latent fingerprint (such as the opposite edges) disposed on such small subjects may be appreciably farther from a lens of the image capturing device 40 than other aspects due to the increased curvature of the subject. The increased curvature may be significant enough to degrade the sharpness of focus of these areas even when an image capturing device is configured to capture an image with an increased depth of field.

Thus, in an additional embodiment, a holding fixture 500 may be incorporated into imaging system 10 to facilitate the capture of a latent image on such surfaces with increased curvature. Additionally, a modified image capture process, such as process 800, may be used in conjunction with the holding fixture 500 to capture a latent fingerprint according to the disclosed embodiments.

As described in great detail below, process 800, incorporating a holding fixture 500, maintains a fixed relative position between image capturing device 40 and a light source 20. In this embodiment, the subject 30 is now rotated and translated relative to the fixed image capturing device 40 and light source 20. Subject 30, in this embodiment, may be both rotated and translated using holding fixture 500 to enable various aspects of a latent fingerprint to be captured in greater detail. By rotating subject 30, aspects of a latent fingerprint that may not be in focus when in a first position may be brought into focus in the second rotated/translated position. By rotating/translating subject 30 in both directions, each desired aspect of a latent fingerprint may be captured in focus by image capturing device 40 over a plurality of images. Conceptually, a latent fingerprint may be unrolled as viewed and captured by image capturing device 40. The translation and rotation may occur in a manner such that a latent fingerprint, or other evidence, on a small cylindrical object may be "unrolled" to an extent without changing the field of view of image capturing device 40 over a plurality of images. These multiple images may then be integrated using the same integration process 400 discussed above.

In order to use the integration process 400, the image capturing device 40 should capture the same field of view relative to subject 30 in each of the plurality of captured images. In this manner, corresponding pixels of the multiple images may correspond to the same aspects of a latent fingerprint over the plurality of images. Thus, rotation of subject 30 in a clockwise direction should coincide with a translation of subject 30 to the left, as viewed in FIG. 5. In other words, as subject 30 rotates and translates according to the disclosed embodiment, aspects of a latent fingerprint maintain the same relative position in the field of view of image capturing device 40. Such rotation and translation of subject 30 may be facilitated by the holding fixture 500.

Figure 5:
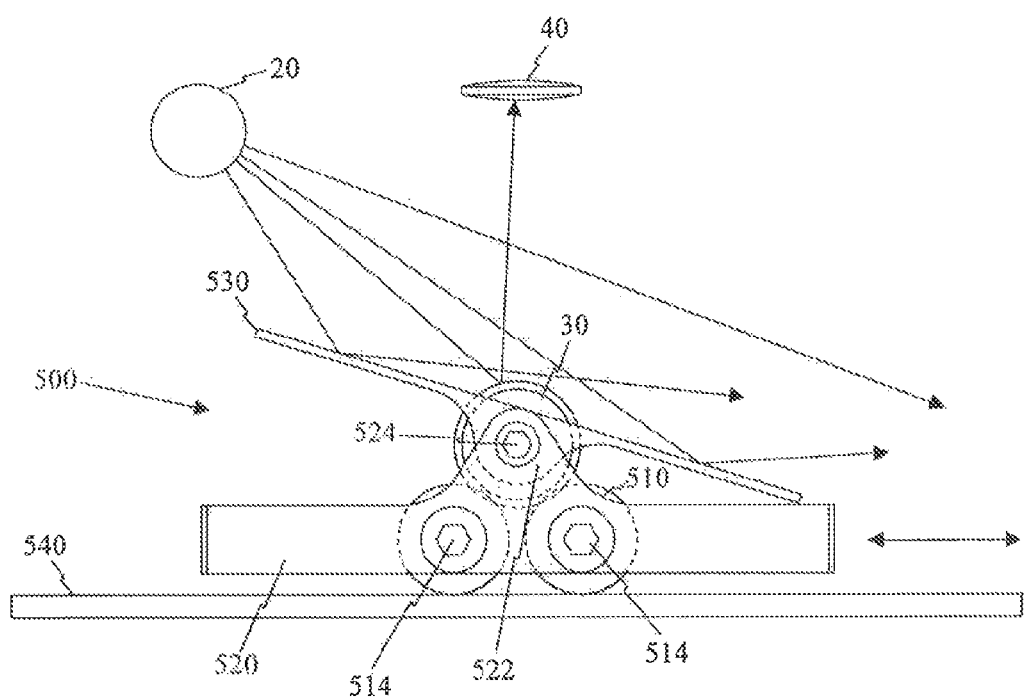
FIG. 5 is a side-view of an exemplary holding fixture that may be utilized in the system of FIG. 1.
Figure 6:
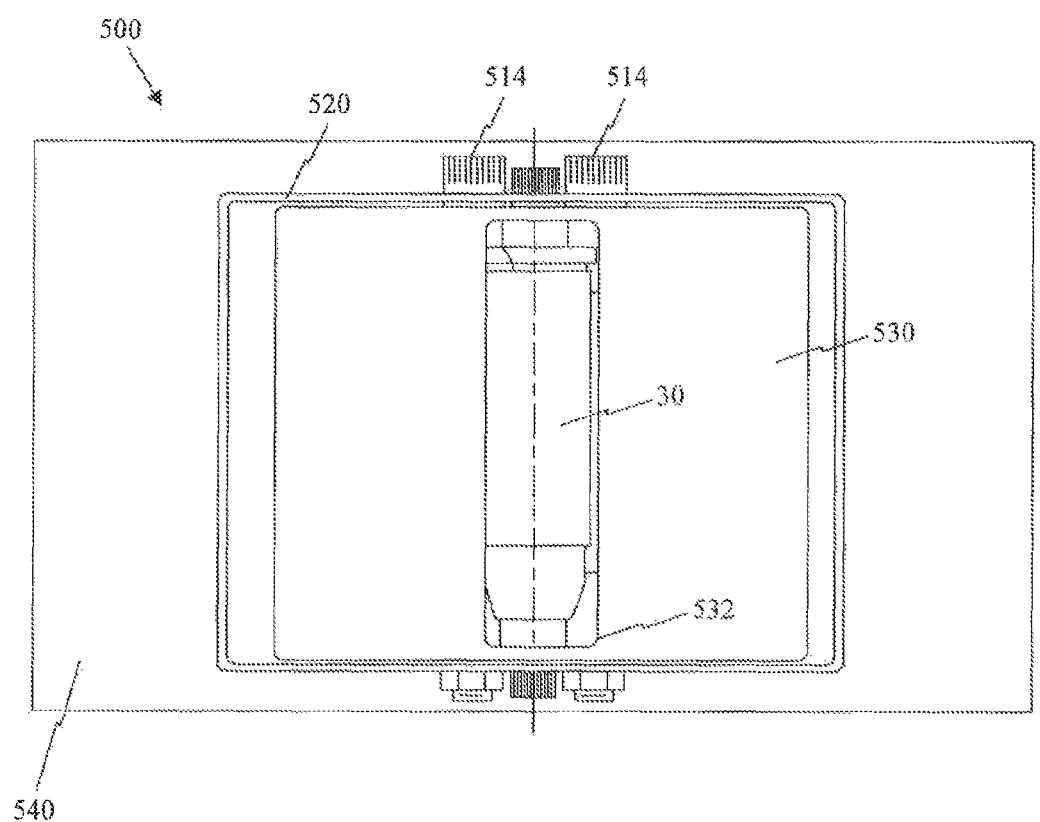
FIG. 6 is a top-view of an exemplary holding fixture that may be utilized in the system of FIG. 1.

The holding fixture 500 may be designed such that movement of holding fixture 500 in one direction (translation of subject 30) simultaneously rotates subject 30 in an opposite direction. In one embodiment, as shown in FIGS. 5 and 6, the holding fixture 500 may include at least two rollers 510 held in place by a frame 520 and a movable optical shield 530 made from a non-reflective or dark material. Holding fixture 500 may be provided on a mat 540 preferably large enough fix at least 2 full rotations of the rollers. Mat 540 may be constructed of silicone or any suitable material, while the rollers 510 may be fabricated from rubber or silicone or any other suitable material.

In one embodiment, frame 520 may be configured to fixedly maintain a relative position of the two rollers 510 with respect to each other. Thus, holding fixture 500 may be configured such that rollers 510 rotate simultaneously together at the same rate and in the same direction. Frame 520 also includes a support portion 522 that may be configured to support optical shield 530. Optical shield 530 may be rotatably supported by frame support portion 522 such that it may be rotated about an axis formed with support portion 522. Optical shield may be affixed to support portion 522 by a connecting member 524. In one embodiment, connecting member 524 may be configured to lock optical shield 530 at a desired angle, such that it remains fixed at any time during an image capturing process 800. Optical shield 530 may be of a dimension similarly sized to cover frame 520. Additionally, optical shield 530 includes an opening 532, sized to support subject 30 such that it does not substantially shield the surface of subject 30. The opening 532 of optical shield 530 may be configured to cover or shield rollers 510 underneath subject 30, so as to prevent any unwanted reflection of light off of rollers 510.

In one embodiment, rollers 510 may be configured to be the same diameter as the cylindrical subject 30 containing a latent fingerprint to be captured according to the disclosed embodiments. In practical application, many rollers 510 of various sizes may be readily interchangeable with the holding fixture 500 as needed according to the size of the subject 30. For example, holding fixture 500 may be designed for use with a plurality of shell casings of various caliber and size. Thus, to capture a latent fingerprint on any variety of shell casings, holding fixture 500 may be configured with rollers 510 of the desired size corresponding to the size of the casing.

Interchangeability of the rollers 510 may be achieved utilizing a snap fit with frame 520. Alternatively rollers 510 may be securely fastened to frame 520 utilizing any suitable interconnection, such as with a connecting member 514. In the disclosed embodiments, rollers 510 are configured to be rotatable with respect to frame 520. Connecting member 514, however, may also be configured to lock rollers 510 from rotating as desired.

Figure 7A:
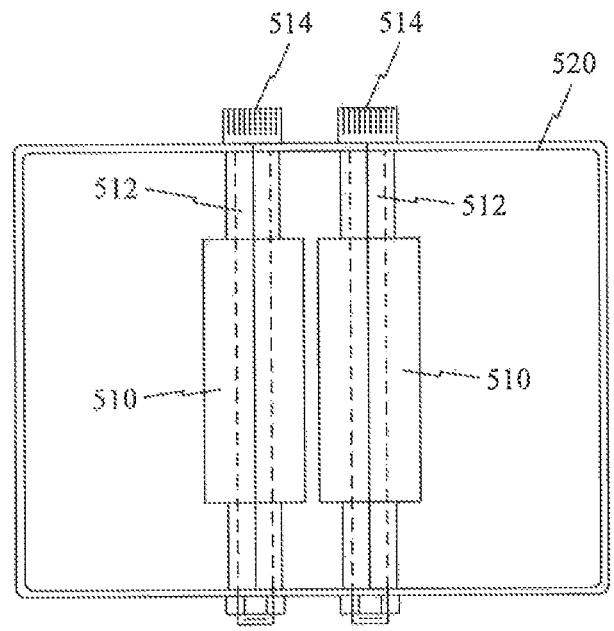
FIGS. 7a and 7b are top-views of an exemplary holding fixture that may be utilized in the system of FIG. 1.
Figure 7B:
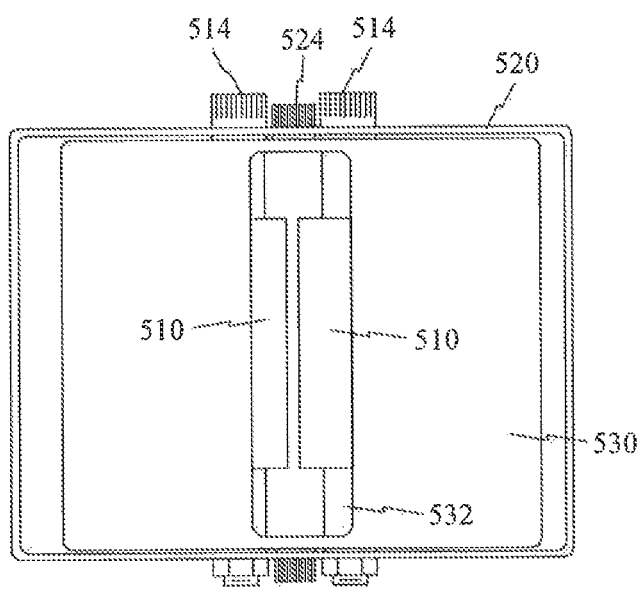

Holding fixture 500 may also include integral rollers 510, thus necessitating the use of various holding fixtures 500, one for each of a specific size of subject 30. Rollers 510 may be configured to have a uniform diameter along its length, or alternatively, may include a diameter portion, such as 510 shown in FIG. 7a, that may be larger than an elongated spindle like portion 512 supporting roller 510. Portion 510 of the roller may be preferably sized to be the same as the diameter of a subject 30. Additionally, rollers 510 may be configured such that their diameters may be varied or adjustable, for example by adding or subtracting preformed cylindrical shells, layers, shims etc. that may be formed around a spindle-like portion 512, as shown in FIG. 7a. While FIG. 5 depicts two rollers 510, more rollers may be also used as desired. Additionally, for cylindrical objects with variable diameter, such as a tapered rifle shell casing, tapered roller sections may be used to match the tapered profile of the subject 30 containing a latent fingerprint to be captured.

In another embodiment, mat 540 may be replaced with a guide or track or other suitable system. Mat 540 functions to prevent the holding fixture 500 from moving in a direction other than that perpendicular to the length of rollers 510. During movement of holding fixture 500, mat 540 functions to prevent any twisting of the holding fixture 500 while it is being moved. Thus, any apparatus for ensuring precise lateral movement of holding fixture 540 may be utilized. In the disclosed embodiment, holding fixture 500 may be moved by a user operating imaging system 10 during an image capturing process 800, shown in FIG. 8. Alternatively, the holding fixture 500 may be designed with springs, an electric motor, or some other control mechanism to automatically move the holding fixture 500 at a desired rate and direction during an image capturing process 800.

In one embodiment, holding fixture 500 may be utilized in an imaging system 10 as similarly described with respect to FIG. 1. In this embodiment, the holding fixture 500 may be positioned in the field of view of image capturing device 40. In one embodiment, shown in FIG. 5, holding fixture 500 may be positioned on a mat 540. Holding fixture 500 may be positioned such that a subject 30 containing a latent fingerprint may be positioned in the center of the field of view of the image capturing device 40. As shown, a cylindrical subject 30 containing latent evidence, such as a shell casing with a latent fingerprint, may be positioned on top and between rollers 510. In this embodiment, rollers 510 may be in physical contact with subject 30, such that rotation of rollers 510 in one direction may effect an equal rotation of subject 30 in the opposite direction. An image capturing process 800 utilizing holding fixture 500 will now be described.

FIG. 8 shows a flowchart of a disclosed embodiment of an image capturing process 800 for capturing latent fingerprints provided on a cylindrical subject of small diameter, such as a shell casing for example. Much of the image capturing process 800 performs the same operations as image capturing process 200. Thus, many aspects of image capturing process 200 can be implemented in process 800 as well, except for the differences pointed out below. As shown, as part of operation 810 and 820, a subject 30 may be illuminated by light source 20, such as a UV lamp. In operation 820, the light source 20 may be positioned at an angle so as to achieve specular reflection along the length of the cylindrical subject 30 and in the center of the field of view of image capturing device 40. Light source 20 may be positioned, for example, at an angle between 0 and 180 degrees, which may be dependent on the curvature of the cylindrical object. Thus, in this embodiment, a specimen of latent evidence, such as a latent fingerprint, provided on the surface of cylindrical subject 30 closest to a lens of image capturing device 40 may be specularly reflected into the center of the field of view of the image capturing device 40. Operations 810 and 820 may be performed in the same manner as operations 310 through 370 described above with respect to illumination method 300. Thus, discussion of those operations is excluded from the disclosure of this embodiment.

In operation 830, the optical shield 530 may be adjusted to block any other specular reflection that may be reflecting off of any aspect of holding fixture 500. Thus, optical shield 530 may function to enable only the specular reflection from a subject 30 to reach image capturing device 40. Once a suitable position and intensity of light source 20 and parameters of image capturing device 40 are configured, as similarly discussed with respect to FIG. 3, operation 840 of image capturing process 800 may capture a first image corresponding to a first aspect of the latent fingerprint. The captured image may include gray scale data of the captured image. Throughout the remainder of image capturing process 800, the position of light source 20 and the position of image capturing device 40 remain fixed or stationary.

In operation 850, the holding fixture 500 may be moved in a direction perpendicular to the rollers 510. Holding fixture 500 may be moved such that rollers 510 rotate in a counter-clockwise or clockwise direction. Throughout process 800, it may be necessary to move the holding fixture 500 in both directions to completely "unroll" a latent fingerprint on the surface of subject 30.

As the holding fixture is moved in a first direction effecting rotation of rollers 510 in the first direction, subject 30 in contact with rollers 510 will be caused to rotate in a second, opposite direction by the same or similar amount. Movement of the holding fixture 500 also translates subject 510, but due to the opposite rotation of subject 30, the relative position of a latent fingerprint on the surface of subject 30 appears to remain fixed in the field of view of image capturing device 40. Each aspect of a latent fingerprint on the surface of subject 30 retains its relative position in the field of view of image capturing device 40. Each aspect, however, changes distance (moving closer to or farther away) from a lens of the image capturing device 40 while remaining in the same relative position in the field of view. Image capturing process 800 may capture the specular reflection of each aspect of a latent fingerprint in its position closest to a lens of image capturing device 40 as the latent fingerprint is "unrolled", thus capturing detail of that aspect.

During operation 850, optical shield 530 may be rotated to block reflections occurring as a result of the lateral movement of holding fixture 500 such that specular reflection may be only acquired from subject 30. Once subject 30 has been rotated a desired amount to achieve specular reflection of another aspect of the latent fingerprint, operation 860 may be performed to capture a second image including gray scale data of the captured second image. Similar to image capturing process 200, rotation of subject 30 may enable new aspects of a latent fingerprint to be specularly reflected into image capturing device 40. Holding fixture 500 may be moved by a desired amount in either direction to achieve specular reflection of all aspects of the latent fingerprint to be captured by image capturing device 40.

In the above operations 840 and 860, the captured images may be separate discrete images captured by image capturing device 40. For example, image capturing device may be configured or controlled to capture a single frame image for each of a desired aspect of the latent fingerprint. In another embodiment, image capturing device 40 may capture or grab the images from separate frames provided in a video signal captured by image processing device 40, for example. In this embodiment, image capturing device 40 may capture a continuous video image while holding fixture 500 is controlled to "unroll" the latent fingerprint. A capture rate of the video image signal may be preconfigured based on a desired light intensity, exposure time, gain setting and gamma setting, for example. A range of motion of holding fixture 500 during image capturing may depend on the width of the illuminating light from light source 20 to achieve desired illumination of the aspects of the latent fingerprint to be captured. For example, if the width of illuminating light is 1 inch wide, movement of holding fixture may be about 1 inch.

In operation 870 the first captured image and the second captured image may be compared on a pixel-by-pixel basis. Operation 870 may be performed in the manner as discussed above with respect to integration process 400, as shown in FIG. 4. Operations 880 and 890 may be executed in the same or similar manner as operations 280 and 290 described above with respect to FIG. 2 to create and display an integrated image. If operation 890 determines that the integrated image may not include each of the desired aspects of the latent fingerprint, operation 852 may then be performed similar to operation 850 to rotate and translate a subject 30 such that a subsequent aspect of the latent fingerprint may be captured in the specular reflection of light source 20. In operation 852, the holding fixture may be moved again in the same or opposite direction to achieve specular reflection of another aspect of the latent fingerprint on the surface of subject 30.

Once the subject 30 is rotated a desired amount to achieve the desired specular reflection of a new aspect of a latent fingerprint, operation 862 may capture the new aspect in a subsequent image including gray scale data of the captured specular reflection. The image captured in operation 862 may be a still image or a frame grabbed from a video image signal, as discussed above. Operation 872 may be executed similar to that described with respect to operation 272 to perform a pixel by pixel comparison of the previously integrated image and the captured subsequent image.

Image capturing process 800 may continue in this manner until each desired aspect of a latent fingerprint may be specularly reflected and captured by image capturing device 40 based on a determination in operation 890. As similarly discussed above with respect to operation 290 in FIG. 2, imaging system 10 may be configured or controlled to determine whether to end process 800 based on other factors, such as a determination that the desired range of rotation of subject 30 has been executed. For example, rotation of subject 30 may be controlled and automated by a servo motor or other suitable device that may also signal a predetermined range of motion has completed.

Embodiments described above include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method.

The one of more processors disclosed in the above embodiments may include one or more known processing devices, such as a microprocessor from the Pentium™ family manufactured by Intel™ or the Turion™ family manufactured by AMD™. Each of the disclosed processors may constitute a single core or multiple core processor that executes parallel processes simultaneously. For example, the disclosed processors may be a single core processor configured with virtual processing technologies. In certain examples, disclosed processors may use logical processors to simultaneously execute and control multiple processes. The disclosed processors may implement virtual machine technologies, or other known technologies to provide the ability to execute, control, run, manipulate, store, etc. multiple software processes, applications, programs, etc. In another example, disclosed processors may include a multiple-core processor arrangement (e.g., dual, quad, quad core, etc.) configured to provide parallel processing functionalities to allow the computing device 70 or an image capturing device 40 to execute multiple processes simultaneously. One of ordinary skill in the art would understand that other types of processor arrangements could be implemented that provide for the capabilities disclosed herein.

It will be apparent to those skilled in the art that various modifications and variations can be made to the system of the present disclosure. Other embodiments of the system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:
1. A system for generating an integrated image of a fingerprint present on a curved surface of an object, the system comprising:
   an imaging assembly including a light source and an image capturing device, the imaging assembly enabling selective illumination of the fingerprint on the curved surface of the object to selectively create specular reflections of different aspects of the fingerprint for capture by the image capturing device;

a memory storing a set of instructions; and at least one processor configured to execute the set of instructions to:

receive first image information corresponding to a first image captured by the image capturing device, the first image information including pixel values for pixels of the captured first image, and wherein a first representation of the fingerprint appears within a first set of pixels of the captured first image, and the captured first image includes data representing a specular reflection from a first aspect of the fingerprint;

receive second image information corresponding to a second image captured by the image capturing device, the second image information including pixel values for pixels of the captured second image, and wherein a second representation of the fingerprint appears within a second set of pixels of the captured second image, and the captured second image includes data representing a specular reflection from a second aspect of the fingerprint, the second aspect of the fingerprint being different than the first aspect of the fingerprint, and the second set of pixels of the captured second image occupying substantially a same region of the captured second image as the first set of pixels occupies in the captured first image;

compare a first plurality of pixel values from the first set of pixels with a corresponding second plurality of pixel values from the second set of pixels;

determine, for each compared pixel, whether a selected pixel from the first set of pixels or a corresponding pixel from the second set of pixels has a higher pixel value; and for each compared pixel, store in a pixel value set the pixel value of the selected pixel from the first set of pixels if the selected pixel has a higher pixel value than the corresponding pixel from the second set of pixels, and store in the pixel value set the pixel value of the corresponding pixel from the second set of pixels if the corresponding pixel has a higher pixel value than the selected pixel from the first set of pixels, wherein the pixel value set provides an integrated image of the fingerprint formed from detail obtained in the specular reflection from the first aspect of the fingerprint and the specular reflection from the second aspect of the fingerprint.

2. The system of claim 1, wherein each pixel value in the pixel value set is represented as a gray scale value.

3. The system of claim 1, wherein the fingerprint comprises a latent fingerprint.

4. The system of claim 1, wherein the specular reflection of the first and second aspects from the fingerprint are generated by an ultraviolet light source.

5. The system of claim 4, wherein the image capturing device comprises an ultraviolet sensitive camera.

6. The system of claim 1, wherein the at least one processor is further configured to execute one or more of the instructions to:

receive third image information corresponding to a third image captured by the image capturing device, the third image information including pixel values for pixels of the captured third image, and wherein a third representation of the fingerprint appears within a third set of pixels of the captured third image, and the captured third image includes data representing a specular reflection from a third aspect of the fingerprint;

compare a third plurality of pixel values from the third set of pixels with a corresponding plurality of pixel values from the pixel value set;

determine, for each compared pixel, whether a selected pixel from the third set of pixels has a higher pixel value than a corresponding pixel from the pixel value set; and for each compared pixel, if the selected pixel from the third set of pixels has a higher pixel value than a corresponding pixel from the pixel value set, change the pixel value of the corresponding pixel in the pixel value set to the pixel value of the selected pixel from the third set of pixels.

7. The system of claim 1, wherein the first aspect of the fingerprint corresponds to a part of the fingerprint on the curved surface at a first distance from the image capturing device, and the second aspect of the fingerprint corresponds to a part of the fingerprint on the curved surface at a second distance from the image capturing device greater than the first distance.

8. The system of claim 7, wherein the specular reflection of the first aspect of the fingerprint is provided by the light source positioned at a first position relative to the image capturing device and the specular reflection of the second aspect of the fingerprint is provided by the light source positioned at a second, different position relative to the image capturing device.

9. The system of claim 8, wherein the object and the image capturing device are fixed relative to each other.

10. The system of claim 1, wherein in the first image, the first aspect of the fingerprint corresponds to a part of the fingerprint on the curved surface at a first distance from the image capturing device, and in the second image, the first aspect of the fingerprint is positioned at a second distance from the image capturing device different from the first distance.

11. The system of claim 10, wherein the specular reflection of the first and second aspects of the fingerprint are provided by the light source positioned at a fixed position relative to the image capturing device.

12. The system of claim 11, wherein for the first image, the object is provided in a first position, and for the second image, the object is provided in a second position, and wherein the object both rotates and translates laterally in moving from the first position to the second position.

13. The system of claim 12, wherein the object is moved from the first position to the second position by a holding fixture configured with at least two rollers each with a diameter corresponding to the diameter of the object at the curved surface, such that rotation of the rollers in a first direction causes both rotation of the object in a rotational direction opposite the first direction, and the translational lateral movement of the object.

14. A computer readable medium that comprises a set of instructions executable by at least one processor to cause the at least one processor to perform a method for generating an integrated image of a fingerprint present on a curved surface of an object using an imaging assembly including a light source and an image capturing device, the imaging assembly enabling selective illumination of the fingerprint on the curved surface of the object to selectively create specular reflections of different aspects of the fingerprint for capture by the image capturing device, the method comprising the following operations:

receiving first image information corresponding to a first image captured by the image capturing device, the first image information including pixel values for pixels of the captured first image, and wherein a first representation of the fingerprint appears within a first set of pixels of the captured first image, and the captured first image includes data representing a specular reflection from a first aspect of the fingerprint;

receiving second image information corresponding to a second image captured by the image capturing device, the second image information including pixel values for pixels of the captured second image, and wherein a second representation of the fingerprint appears within a second set of pixels of the captured second image, and the captured second image includes data representing a specular reflection from a second aspect of the fingerprint, the second aspect of the fingerprint being different than the first aspect of the fingerprint, and the second set of pixels of the captured second image occupying substantially a same region of the captured second image as the first set of pixels occupies in the captured first image;

comparing a first plurality of pixel values from the first set of pixels with a corresponding second plurality of pixel values from the second set of pixels;

determining, for each compared pixel, whether a selected pixel from the first set of pixels or a corresponding pixel from the second set of pixels has a higher pixel value; and for each compared pixel, storing in a pixel value set the pixel value of the selected pixel from the first set of pixels if the selected pixel has a higher pixel value than the corresponding pixel from the second set of pixels, and store in the pixel value set the pixel value of the corresponding pixel from the second set of pixels if the corresponding pixel has a higher pixel value than the selected pixel from the first set of pixels, wherein the pixel value set provides an integrated image of the fingerprint formed from detail obtained in the specular reflection from the first aspect of the fingerprint and the specular reflection from the second aspect of the fingerprint.

15. The computer readable medium of claim 14, wherein the set of instructions executable by at least one processor further cause the at least one processor to perform the following operations:

receiving third image information corresponding to a third image captured by the image capturing device, the third image information including pixel values for pixels of the captured third image, and wherein a third representation of the fingerprint appears within a third set of pixels of the captured third image, and the captured third image includes data representing a specular reflection from a third aspect of the fingerprint;

comparing a third plurality of pixel values from the third set of pixels with a corresponding plurality of pixel values from the pixel value set;

determining, for each compared pixel, whether a selected pixel from the third set of pixels has a higher pixel value than a corresponding pixel from the pixel value set; and for each compared pixel, if the selected pixel from the third set of pixels has a higher pixel value than a corresponding pixel from the pixel value set, change the pixel value of the corresponding pixel in the pixel value set to the pixel value of the selected pixel from the third set of pixels.

16. A method for generating an integrated image of a fingerprint present on a curved surface of an object using an imaging assembly including a light source and an image capturing device, the imaging assembly enabling selective illumination of the fingerprint on the curved surface of the object to selectively create specular reflections of different aspects of the fingerprint for the capture by the image capturing device, the method comprising the following operations performed by one or more processors:

receiving first image information corresponding to a first image captured by the image capturing device, the first image information including pixel values for pixels of the captured first image, and wherein a first representation of the fingerprint appears within a first set of pixels of the captured first image, and the captured first image includes data representing a specular reflection from a first aspect of the fingerprint;

receiving second image information corresponding to a second image captured by the image capturing device, the second image information including pixel values for pixels of the captured second image, and wherein a second representation of the fingerprint appears within a second set of pixels of the captured second image, and the captured second image includes data representing a specular reflection from a second aspect of the fingerprint, the second aspect of the fingerprint being different than the first aspect of the fingerprint, and the second set of pixels of the captured second image occupying substantially a same region of the captured second image as the first set of pixels occupies in the captured first image;

comparing a first plurality of pixel values from the first set of pixels with a corresponding second plurality of pixel values from the second set of pixels;

determining, for each compared pixel, whether a selected pixel from the first set of pixels or a corresponding pixel from the second set of pixels has a higher pixel value; and for each compared pixel, storing in a pixel value set the pixel value of the selected pixel from the first set of pixels if the selected pixel has a higher pixel value than the corresponding pixel from the second set of pixels, and store in the pixel value set the pixel value of the corresponding pixel from the second set of pixels if the corresponding pixel has a higher pixel value than the selected pixel from the first set of pixels, wherein the pixel value set provides an integrated image of the fingerprint fOrmed from detail obtained in the specular reflection from the first aspect of the fingerprint and the specular reflection from the second aspect of the fingerprint.

17. The method of claim 16, further comprising:

receiving third image information corresponding to a third image captured by the image capturing device, the third image information including pixel values for pixels of the captured third image, and wherein a third representation of the fingerprint appears within a third set of pixels of the captured third image, and the captured third image includes data representing a specular reflection from a third aspect of the fingerprint;

comparing a third plurality of pixel values from the third set of pixels with a corresponding plurality of pixel values from the pixel value set;

determining, for each compared pixel, whether a selected pixel from the third set of pixels has a higher pixel value than a corresponding pixel from the pixel value set; and for each compared pixel, if the selected pixel from the third set of pixels has a higher pixel value than a corresponding pixel from the pixel value set, change the pixel value of the corresponding pixel in the pixel value set to the pixel value of the selected pixel from the third set of pixels.

18. The method of claim 17, further comprising:
wherein the specular reflection of the first aspect of the fingerprint is provided by the light source positioned at a first position relative to the image capturing device and the specular reflection of the second aspect of the fingerprint is provided by the light source positioned at a second, different position relative to the image capturing device, and further wherein the object and the image capturing device are fixed relative to each other.

19. The method of claim 17, further comprising:
wherein in the first image, the first aspect of the fingerprint corresponds to a part of the fingerprint on the curved surface at a first distance from the image capturing device, and in the second image, the first aspect of the fingerprint is positioned at a second distance from the image capturing device, and further wherein the specular reflection of the first and second aspects of the fingerprint are provided by the light source positioned at a fixed position relative to the image capturing device.

20. The method of claim 19, further comprising:
wherein for the first image, the object is provided in a first position, and for the second image, the object is provided in a second position, and wherein the object is moved from the first position to the second position by a holding fixture configured with at least two rollers each with a diameter corresponding to the diameter of the object at the curved surface, such that rotation of the rollers in a first direction causes both rotation of the object in a rotational direction opposite the first direction, and the translational lateral movement of the object.

* * * * *